(12) United States Patent
Grover

(10) Patent No.: US 9,225,460 B2
(45) Date of Patent: Dec. 29, 2015

(54) WHOLE FIBER SWITCHED P-CYCLES

(75) Inventor: Wayne D. Grover, Edmonton (CA)

(73) Assignee: TR Technologies Inc., Edmonton, Alberta (CA)

( * ) Notice: Subject to any disclaimer, the term of this patent is extended or adjusted under 35 U.S.C. 154(b) by 682 days.

(21) Appl. No.: 13/280,752

(22) Filed: Oct. 25, 2011

(65) Prior Publication Data

US 2012/0114282 A1   May 10, 2012

Related U.S. Application Data

(60) Provisional application No. 61/406,558, filed on Oct. 25, 2010.

(51) Int. Cl.
*G02B 6/26* (2006.01)
*H04J 3/14* (2006.01)
*H04J 14/02* (2006.01)

(52) U.S. Cl.
CPC ......... *H04J 14/0268* (2013.01); *H04J 14/0284* (2013.01); *H04J 14/0212* (2013.01); *H04J 14/0213* (2013.01)

(58) Field of Classification Search
None
See application file for complete search history.

(56) References Cited

U.S. PATENT DOCUMENTS

| | | | |
|---|---|---|---|
| 7,403,473 B1* | 7/2008 | Mehrvar et al. | 370/217 |
| 2003/0223357 A1* | 12/2003 | Lee | 370/218 |
| 2007/0153674 A1* | 7/2007 | Alicherry et al. | 370/216 |
| 2009/0161536 A1* | 6/2009 | Grover et al. | 370/221 |
| 2010/0039934 A1* | 2/2010 | McGuire et al. | 370/225 |

OTHER PUBLICATIONS

Wayne D. Grover: Cycle-Oriented Distributed Preconfiguration: Ring-Like Speed With Mesh-Like Capacity for Self-Planning Network Restoration; IEEE, 1998; p. 537-543.
Dominic A. Schupke et al: Configuration of p-Cycles in WDM Networks With Partial Wavelength Conversion; Photonic Network Communications, 6:3; 2003; p. 239-252.
Aden Grue et al: CAPEX Costs of Lightly Loaded Restorable Networks Under a Consistent WDM Layer Cost Model; IEEE, 2009; p. 1-6.
William C. Dickson et al: 64×64 3D-MEMS Switch Control System With Robustness to MEMS Resonant Frequency Variation and Pointing Drift; ThQ5, 2004; p. 1-3.
Diane P. Onguetou et al: p-Cycle Network Design: From Fewest in number to Smallest in Size; Apr. 1, 2010, p. 1-16.
Aden Grue et al: Comparative Study of Fully Pre-Cross-Connected Protection Architectures for Transparent Optical Networks; 2007; p. 1-8.
M. Gunkel et al: A Cost Model for the WDM Layer; 2006; IEEE; Photonics in Switching Conference; p. 1-6.

(Continued)

*Primary Examiner* — Hemang Sanghavi
(74) *Attorney, Agent, or Firm* — Anthony R. Lambert

(57) ABSTRACT

A communication network in which p-cycles are used to rapidly, simply and efficiently provide for the direct replacement of failed fiber sections with whole replacement fibers. As long as the loss budgets are adequate, entire DWDM wavebands can be restored with no switching or manipulation of individual lightpaths. Following a substitution transient, the DWDM layer would never know the break happened. In environments where fiber switching devices are low cost, and ducts are full of dark fiber, this could provide a very low cost alternative to protect an entire DWDM transport layer (or working capacity envelope) against the single largest cause of outage.

1 Claim, 13 Drawing Sheets

(56) References Cited

OTHER PUBLICATIONS

Anthony Sack et al: Hamiltonian p-Cycles for Fiber-Level Protection in Homogeneous and Semi-Homogeneous Optical Networks; IEEE; Mar./Apr. 2004; p. 49-56.

Diane Prisca Onguetou et al: Whole Fiber Switched p-Cycles; Apr. 1, 2010; p. 1-16.

Downloaded from www.glimmerglass.com on Aug. 22, 2012: Optical Networking Solutions-Glimmerglass Optical Cyber Solutions; p. 1.

* cited by examiner

WHOLE FIBER SWITCHED P-CYCLES

BACKGROUND p-Cycle survivable networks were introduced in the late 1990s, with the aim of bringing the simplicity and rapidity of survivable rings in the much more flexible and efficient full mesh-based context. There has been an increased interest in p-cycles over the last decade. But related prior research on p-cycles mainly assumes an optical switching based on the wavelength level of granularity. p-Cycles' configuration on a per-wavelength basis is generally more than attractive from the perspective of flexibility in the routing of working paths and freedom in the selection of protecting structures.

But wavelength switching may also involve higher costs mainly due to operations in the electronic domain. This is often the case in opaque transport networks where wavelength discontinuities require optic-electronic-optic (o-e-o) conversion capabilities at every node across working paths and p-cycles. Wavelength conversion is also partially required, at least at the entry points of working paths into p-cycles, for hybrid p-cycle architectures. In hybrids, a given p-cycle is not actually required to ride onto the same wavelength as the working paths it handles, although working paths and p-cycles are independently assumed transparent, i.e. they must thus keep the same wavelength en route. Actual attempts to eliminate or reduce much of the higher costs due to electronics give rise to full transparent network architectures. Working paths and p-cycles are still transparent but unlike with hybrids, the wavelength used by a given working path must also match the same optical frequency (or "color") assigned to its protecting cycles. Readers may want to look at D. A. Schupke, M. C. Sheffel and W. D. Grover, "Configuration of p-Cycles in WDM Networks with Partial Wavelength Conversion," Photonic Network Communications, Kluwer Academy Publishers, vol. 6, no. 3, pp. 239-252, November 2003 for more details of p-cycles' configuration in opaque, hybrid and transparent optical domains.

Glass switched p-cycles constitute a promising alternative to wavelength switched p-cycles in a fully transparent context. The idea is to keep the flexible normal state routing of wavelength based configurations; but use in place of optical cross-connects (OXCs), other cross-connect devices having the ability to switch (at once) all wavelengths of an entire failed fiber optic into a p-cycle formed out of span fibers. In A. Grue, W. D. Grover, M. Clouqueur, D. A. Schupke, D. Baloukov, D. P. Onguetou, B. Forst, Capex Costs of Lightly Loaded Restorable Networks Under a Consistent WDM Layer Cost Model, in: Proceedings of the IEEE International Conference on Communications (ICC), Dresden, Germany, 2009, such a fiber-level protection was proven to have a great potential for eliminating wavelength continuity constraint and computational complexity issues in fully transparent p-cycle designs. Furthermore, obtaining a CapEx cost-effective design using span-protecting p-cycles required to substitute wavelength for glass switched p-cycles, with the cost of ports on the hypothetical fiber switch estimated to be 10% of the cost of wavelength selective ports on a traditional OXC.

From another perspective, wavelength assignment and wavelength continuity constraints required in the restored state for fully transparent p-cycle network architectures certainly bring more complexity and computational issues in the conventional p-cycle network design problem. To overcome those issues, protecting structures can be configured on a waveband (as opposed to wavelength) basis, with each waveband of wavelengths treated as a single unit. In J. M. Simmons, Optical Network Design and Planning (Springer 2008), Chaps. 1&2, pp. 1-59, some background and comparison of wavelength vs. waveband switching are provided for many different aspects. Subsequent analysis brought, for instance, an interesting and useful observation that waveband-level protection has a great potential for eliminating wavelength continuity constraints in fully transparent p-cycle design problems. This contribution pertains to specific cases where whole fiber optics define the wavebands.

From a chronological perspective, W. D. Grover, Mesh-Based Survivable Networks: Options and Strategies for Optical, MPLS, SONET, and ATM Networking (PTR Prentice Hall 2003) was the first to state that p-cycle structures can be configured on a waveband (as opposed to wavelength) basis, with each waveband of wavelengths treated as a single unit. The specific case where whole fiber optics define wavebands is now referred to as whole fiber (or simply, "glass") switched p-cycles. The concept of glass switched p-cycles is exciting in that to protect against fiber failures or span cuts, wavelength assignment within the failed fibers is irrelevant as long as p-cycle fibers support the same waveband. This means despite the general recognition that requiring wavelength continuity greatly complicates the basic service routing problem, there are no further complications due to protection considerations if p-cycles are used at the fiberswitching level to protect fully transparent transport networks. Implicitly, every wavelength assignment actually retains continuity under protection rerouting because the corresponding wavelength is by definition free for use on the fiber dedicated for protection (if not already in use protecting another failure).

Applying the concept of p-cycles at a fiber level of protection is exciting in that to protect against fiber failures or span cuts, wavelength assignment within the failed fibers is irrelevant as long as p-cycle fibers support the same waveband. This means despite the general recognition that requiring wavelength continuity greatly complicates the basic service routing problem, there are no further complications due to protection considerations if p-cycles are used at the fiber-switching level to protect fully transparent transport networks. Implicitly every wavelength assignment actually retains continuity under protection rerouting because the corresponding wavelength is by definition free for use on the fiber dedicated for protection, if not already in use protecting another failure.

Possibilities for fiber-level protection with p-cycles were first and briefly stated in W. D. Grover, Mesh-based Survivable Networks: Options and Strategies for Optical, MPLS, SONET and ATM Networking (PTR Prentice-Hall 2003), Chap. 10, pp. 659-748. In providing p-cycle design solutions for homogeneous networks, of exactly two fibers per span with identical number of wavelength channels, authors in A. Sack and W. D. Grover, "Hamiltonian p-Cycles for Fiber-Level Protection in Homogeneous and Semi-Homogeneous Optical Networks," IEEE Network, Special Issue on Protection, Restoration and Disaster Recovery, vol. 18, no. 2, pp. 49-56, March-April 2004 somehow developed the idea (of whole fiber p-cycles). But the study was limited to the usage of Hamiltonian structures only. Although we recognize that an effective p-cycle network design can still be based on a single Hamiltonian with the attraction of a quite easy calculation, we have previously demonstrated that designs involving on the contrary many complementary cycle structures give rise to much more efficiency from the capacity requirement perspectives.

If W. D. Grover, Mesh-Based Survivable Networks: Options and Strategies for Optical, MPLS, SONET, and ATM Networking (PTR Prentice Hall 2003) opened possibilities for fiber-level protection with p-cycles, the seeds of idea have remained unexplored. Perhaps the main reason why whole fiber switched p-cycles have not been seriously challenged is a widespread idea that whole fiber switching operations are very slow.

After a dozen years of history, p-cycles are a now well established and widely studied span-protecting architecture for network survivability. One of the main reasons why p-cycles have been gaining interest over the last decade is low capacity requirement in the designs, in comparison to that needed when using other network protection methods. Another interesting and attractive property of p-cycles is their inherent and efficient response to such advanced questions as single and dual span failure protection, node failure recovery, optical reach control, wavelength assignment and same wavelength protection. But despite so many advantages, the practicability of p-cycles vis-à-vis that of path-protecting pre-cross-connected schemes has remained questionable from the capital expenditure (CapEx) cost perspective because of wavelength switching operations.

In fact, p-cycle configuration types available within the literature typically assume a protection switching based on the wavelength granularity level. Accordingly, authors in D. A. Schupke, M. C. Sheffel, W. D. Grover, Configuration of p-Cycles in WDM Networks with Partial Wavelength Conversion, Photonic Network Communications, Kluwer Academic 6 (3) (2003) 239-252 distinguish between three types of p-cycle configuration in the WDM layer: i.e., opaque, hybrid and fully transparent p-cycle designs.

Although unintentional, authors in A. Sack, W. D. Grover, Hamiltonian p-Cycles for Fiber-level Protection in Homogeneous and Semi-Homogeneous Optical Networks, IEEE Network, Special Issue on Protection, Restoration and Disaster Recovery 18 (2) (2004) p. 49-56 generated the first whole fiber switched p-cycle designs while providing p-cycle network solutions for homogeneous networks, which comprise spans of exactly two fiber optics with identical number of wavelength channels. As a result, only Hamiltonian cycle structures were involved in the solutions. Even though an effective p-cycle network design can still be based on a single Hamiltonian, with the attraction of a quite easy calculation, the preliminary study in D. P. Onguetou, W. D. Grover, p-Cycle Network Design: from Fewest in Number to Smallest in Size, in: Proceedings of the 6th International Workshop on the Design of Reliable Communication Networks (DRCN), La Rochelle, France, 2007 previously demonstrated that designs involving many complementary cycle structures give rise to increased efficiency from spare capacity requirement perspectives.

Overall, configuring p-cycles on a per-wavelength basis is generally more than attractive from the perspectives of flexibility in the routing of working paths and freedom in the selection of protecting structures. But in A. Grue, W. D. Grover, M. Clouqueur, D. A. Schupke, D. Baloukov, D. P. Onguetou, B. Forst, Capex Costs of Lightly Loaded Restorable Networks Under a Consistent WDM Layer Cost Model, in: Proceedings of the IEEE International Conference on Communications (ICC), Dresden, Germany, 2009, we brought to attention that wavelength switching operations in the restored network state greatly increase equipment prices. Where wavelength conversion is allowed, either at p-cycle entry nodes or at every node crossed en route, high equipment costs are incurred because of optic-electronic-optical (o-e-o) conversion from one span to the next, or from the working path to the protection cycle and vice versa.

SUMMARY

An optical telecommunications network has plural nodes connected by plural spans and arranged to form a mesh network, each span comprising at least an optical fiber, at least a span of the plural spans having a different total capacity than at least another span of the plural spans, at least one pre-configured cycle of spare capacity being established in the mesh network, the pre-configured cycle including plural nodes of the mesh network and being pre-connected in readiness for a span failure in advance of the span failure; and whole-fiber switches, each node of the plural nodes of the mesh network having at least a whole fiber switch of the whole fiber switches, the plural nodes of the pre-configured cycle being configured to in the event of a span failure redirect signals affected by the span failure onto the pre-configured cycle. In an embodiment the optical telecommunications network may have at least a span that straddles the at least one pre-configured cycle, and the pre-configured cycle may have at least a whole fiber of spare capacity, and the at least a span that straddles the at least one pre-configured cycle may have two whole fibers of working capacity for each whole fiber of spare capacity in the at least one pre-configured cycle, and the whole fibers of working capacity of the at least a span that straddles the at least one pre-configured cycle are protected by the at least a whole fiber of spare capacity of the at least one pre-configured cycle.

BRIEF DESCRIPTION OF THE DRAWINGS

Embodiments will now be described with reference to the figures by way of example, and in which.

DETAILED DESCRIPTION

Figure 1:
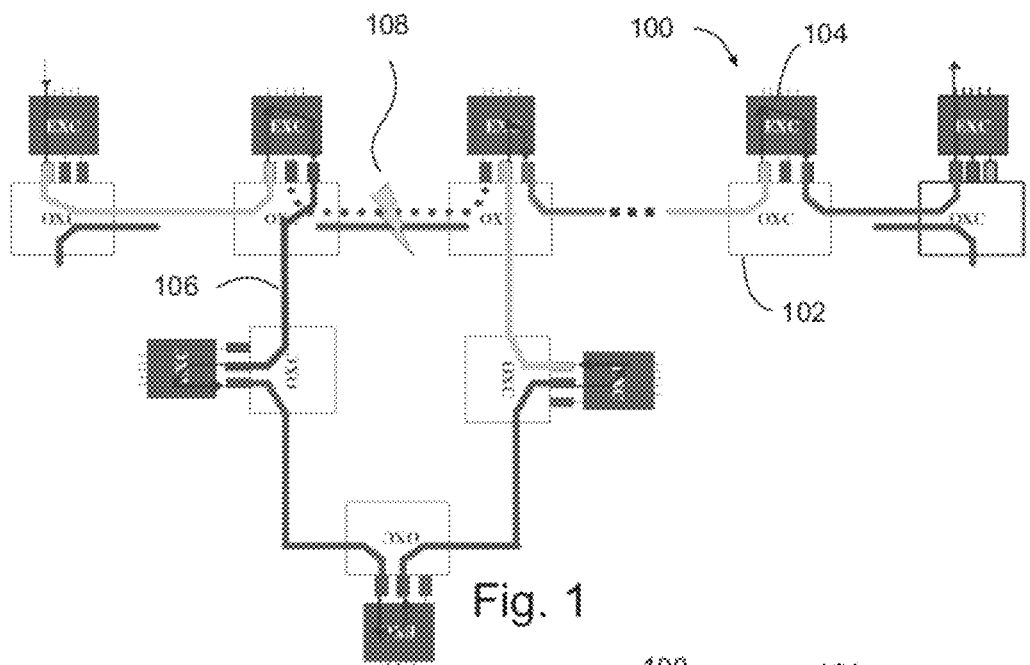
FIG. 1 shows a post-failure state p-Cycle configuration at the WDM layer for an opaque network.
Figure 2:
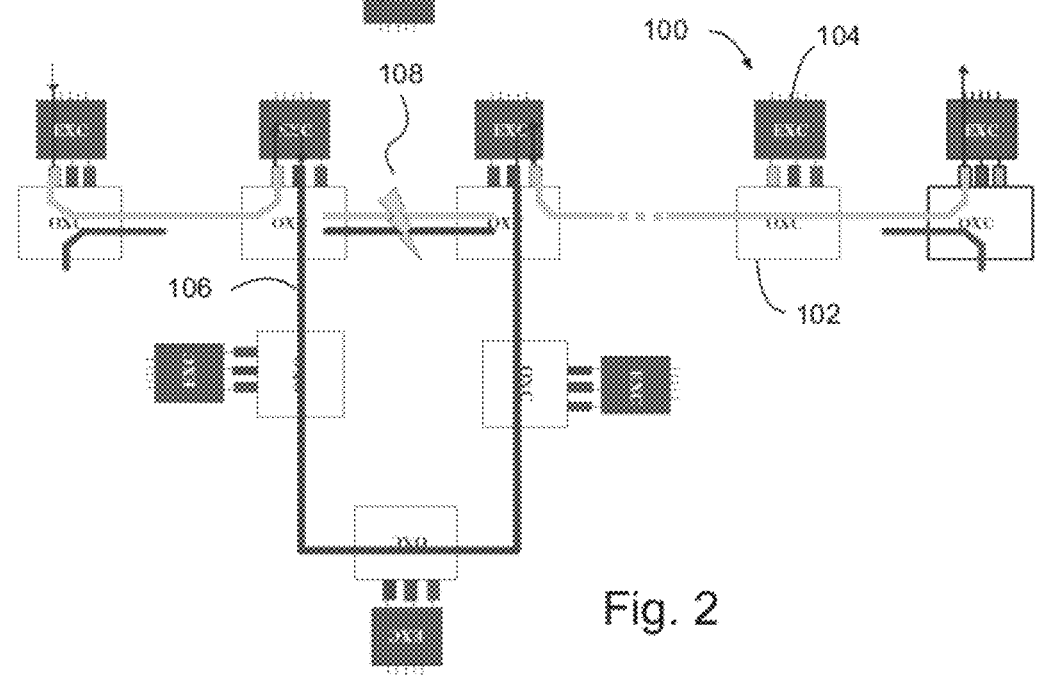
FIG. 2 shows a post-failure state p-Cycle configuration at the WDM layer for a hybrid network.
Figure 3:
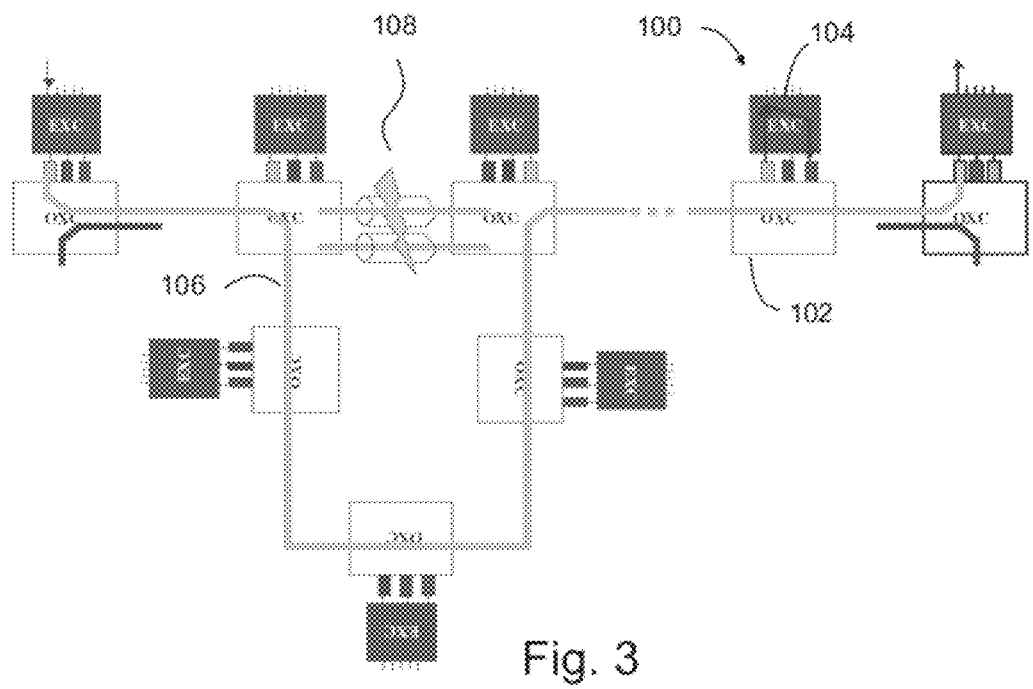
FIG. 3 shows a post-failure state p-Cycle configuration at the WDM layer for a fully transparent network.

FIGS. 1-3 respectively show opaque, hybrid and fully transparent p-cycle designs. For each configuration type, the first lines in FIGS. 1-3 illustrate pre-failure state paths; while the bottom lines plus the second and third nodes in the first lines, and their connecting links comprise p-cycles. In each of FIGS. 1-3, nodes 100 comprise optical cross-connect switches 102 and electrical cross-connect switches 104. Links 106 between nodes may correspond to channels for particular wavelengths in the opaque or hybrid cases or entire fibers in the transparent case. Span failure 108 is typically assumed to affect all channels and fibers of the span.

The opaque configuration case (FIG. 1) implies wavelength discontinuities and thus, o-e-o conversion at every node across working paths and along p-cycles. This means every working path and p-cycle leaves and re-enters the optical domain to access the next span on which it probably rides onto a different wavelength.

In the hybrid configuration type (FIG. 2), pre-failure paths and p-cycles are (independently) transparent; meaning that each of them uses the same wavelength from end-to-end. But a given p-cycle is not required to ride onto the same wavelength as the working paths it handles. For effective post-failure network states, wavelength conversion is partially required and located at the entry points of failed paths into p-cycles.

In the fully transparent context (FIG. 3), working paths and p-cycles are still transparent as with hybrids. But the (same) wavelength used by any given working path is now also required for its protecting cycles: post-failure states only assume an optical switching and the bypass of electrical switches. In contrast to opaque and hybrid wavelength switched p-cycles, an effective transparent p-cycle design subsequently requires the usage of two different types of fibers: one fiber set dedicated to normal state routing (only) and the other to protection channels.

In the design of survivable optical networks, the cost and complexity of wavelength assignment and conversion and wavelength-selective switching is always a dominant consideration. And yet, while nodes and single DWDM channels may fail, a pre-dominant source of unavailability is physical damage to optical cables. Thus, we have considered: If it is ultimately glass that fails, what if just the glass is directly replaced? More specifically, what if p-cycles were used to rapidly, simply and efficiently provide for the direct replacement of failed fiber sections with whole replacement fibers? As long as the loss budgets are adequate, entire DWDM wavebands could be restored with no switching or manipulation of individual lightpaths; so that the DWDM layer would never know the break happened. In environments where fiber switching devices are low cost, and ducts are full of dark fiber, this could provide a very low cost alternative to protect an entire DWDM transport layer (or working capacity envelope) against the single largest cause of outage. One motivation is to remove the complexity due to wavelength assignment and wavelength continuity constraints when configuring p-cycles in a fully transparent network context. Another objective is the overall real CAPEX and OPEX cost reductions.

There is provided supporting theory and results for glass switched p-cycles. Specific goals include an actual state-of-the-art whole fiber cross-connect switch technology; as we guess one of the main reasons why whole fiber p-cycles had not been seriously challenged yet is a widespread idea that (whole) glass switching operations can be very slow. This document proposes an actual state-of-the-art whole fiber cross-connect switch technology. Several commercial examples of whole fiber cross-connect switches are actually reviewed with the purpose of supporting the practical feasibility of glass switched p-cycles. Doing so, this research also ventures a comparison of whole fiber cross connect switches with OXCs from the perspective of costs incurred. The p-cycle network design problem is also revised in a way matching fiber-level protection paradigms. While doing, all possible candidate cycles are now considered as eligible in the design, rather than limiting it solely to Hamiltonian cycle structures. From the experimental perspective, we offer a systematic study of real cost enhancements in glass switched p-cycle networks vis-à-vis that of wavelength-switched p-cycle architectures. Network costs follow equipment-pricing models in M. Gunkel, R. Leppla, M. Wade, A. Lord, D. Schupke, G. Lehmann, C. Furst, S. Bodamer, B. Bollenz, H. Haunstein, H. Nakajima, J. Martensson, "A Cost Model for the WDM Layer," in Proceedings of the International Conference on Photonics in Switching (PS'06), 16-18 Oct. 2006 and R. Huelsermann, M. Gunkel, C. Meusburger and D. Schupke, "Cost Modelling and Evaluation of Capital Expenditures in Optical Multilayer Networks," OSA Journal of Optical Networking (JoN), vol. 7, no. 9, pp. 814-833, September 2008. In this contribution, we mention as well potential applications of whole fiber p-cycles in actual transport networks.

Another objective of this document is to revise the basic p-cycle design problem in a way matching fiber-level protection paradigms. But rather than using only Hamiltonian cycle structures, as A. Sack, W. D. Grover, Hamiltonian p-Cycles for Fiber-level Protection in Homogeneous and Semi-Homogeneous Optical Networks, IEEE Network, Special Issue on Protection, Restoration and Disaster Recovery 18 (2) (2004) 49-56 did, all possible candidate cycles will now be considered as eligible in the design. The complexity of this new ILP mathematical model for whole fiber switched p-cycles will also be compared to that of wavelength switched p-cycle variants.

In fully transparent designs that eliminate the needs for electrical switching, working paths and p-cycles do not ride anymore onto the same fibers, meaning that much more fiber ports are required on the network nodes in order to accommodate working and protection fibers across the network. As will be shown in the detailed description, fully transparent p-cycles also bring computational issues and much more complexity in the design because of wavelength assignment and wavelength continuity constraints.

There is provided supporting theory and additional experimental results for glass switched p-cycles from the technological, mathematical programming and CapEx cost perspectives. We overview commercial whole fiber cross-connect switches; we discuss switching time, data rate, data format and matrix size enhancements, as well as the hypothetical cost reduction over that of wavelength OXCs. We formulate a complete ILP mathematical design model for whole fiber switched p-cycles under fully transparent and maximum reach network conditions; we also study the complexity of this glass-switching ILP vis-à-vis that of wavelength-switching equivalent design models. We adapt a standardized CapEx cost model for wavelength and glass switched p-cycle configuration types and we report a related comparative study of wavelength versus whole fiber switched p-cycles (with an emphasis on the overall equipment cost reduction). We mentions possible applications and perspectives of whole fiber switched p-cycles in actual transport networks. Appendix recalls wavelength switched p-cycle ILPs used for comparison within this document.

Figure 10:
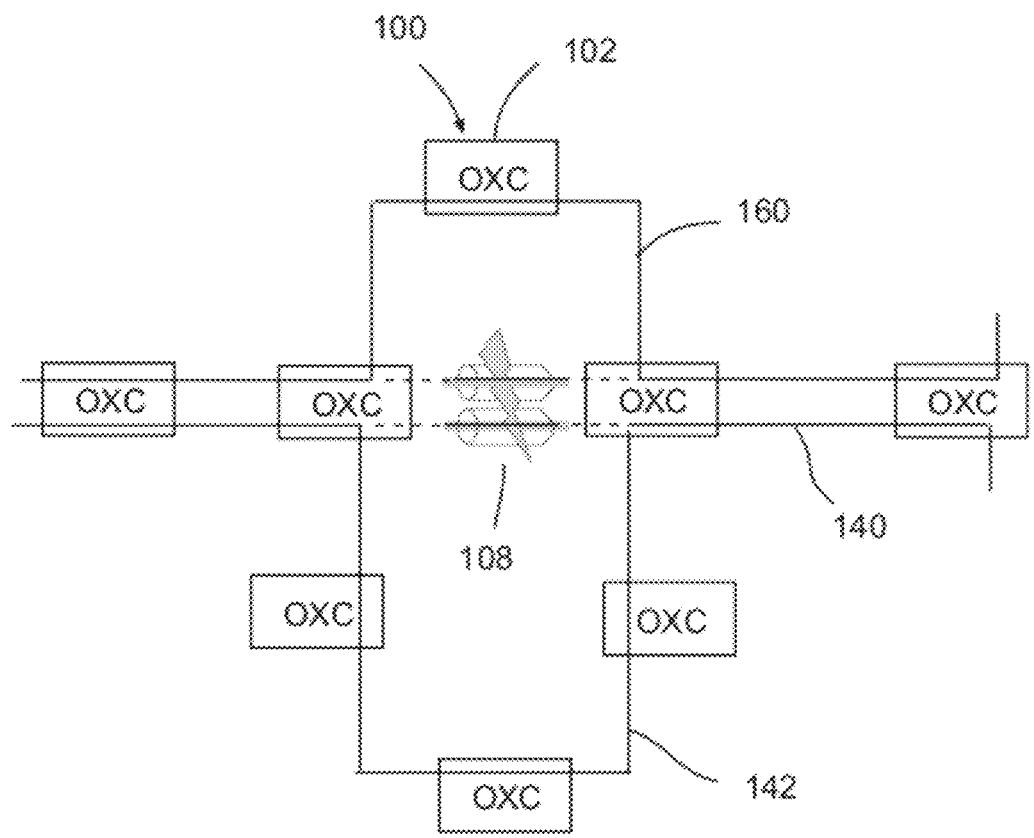
FIG. 10 shows a transparent optical telecommunications network in which a p-cycle with one whole fiber of spare capacity protects a straddling span with two whole fibers of working capacity.

Referring to FIG. 10, a transparent optical telecommunications network with spans 160 and nodes 100, each node having an optical cross-connect 102, has a span that straddles a pre-configured cycle 142, and the pre-configured cycle has a whole fiber of spare capacity, and the span that straddles the at least one pre-configured cycle has two whole fibers of working capacity, and the whole fiber of working capacity of the span that straddles the pre-configured cycle are protected by the whole fiber of spare capacity of the pre-configured cycle in the event of span failure 108 happening to the straddling span. The span straddling the pre-configured cycle may b part of working path 140.

In what follows, several commercial examples of whole-fiber cross-connect switches are discussed with the purpose of supporting practical feasibility of glass switched p-cycles. A p-cycle mathematical design model is formulated for use at the fiber-level protection. A comparative study is done of whole fiber p-cycles vs. wavelength switched p-cycles under the CAPEX network equipment equipment model, with an emphasis on the overall cost reduction.

Commercial Examples of Actual Whole Fiber Cross-Connect Switches

As earlier stated in this paper, all-optical applications and the proliferation of fiber optic technology into various markets offer many benefits. The use of fiber optics to relay data signals over long distance is now widespread. All-optical switching eliminates as well the need for o-e-o conversion, offering the ability to switch optical signals transparently and independently of data rates, formats, wavelengths, protocols and services. All-optical switching also provides network operators with much needed automation capabilities to create, monitor and protect optical lightpaths.

Even though the demand for whole fiber switches has been steadily increased because of the above-mentioned advantages for optical networks, whole fiber cross-connect technology had not yet been seriously challenged in the design of p-cycles. Several reasons are probably that in the past, glass-switching fabrics used to be very slow in practice (1 s or more), bulky, expensive and limited in size to 16×16 or more typically 2×48 matrices. However, recent developments in related field give rise to a new generation of whole fiber switch matrices, which offer the same great performance as before but with faster switching times, more compact form-factors and larger (matrix) sizes. Several papers belonging to actual commercial examples of whole fiber cross-connect switches are available in http://www.glimmerglass.com/index.aspx. Technological solutions in the papers on whole fiber switches relate to micro-electro-mechanical system (MEMS) optical switches. MEMS operating principle is to allow many optical channels to be switched in a relatively small amount of space, utilizing micro-mirrors to switch or to reflect an optical signal from one fiber to another depending on the relative angle of the micro-mirror. Product family overview shows capabilities to transparently interconnect single mode fibers using MEMS micro-mirrors for all traffic data rates reaching up to OC-768, 10GE and DWDM; for all SONET/SDH, Ethernet, digital and analog signal formats; and with matrix sizes going from 24×24 to 192×192 fibers.

The following papers: E. Carr, P. Zhang, D. Keebaugh, K. Chau, "Cost-effective method of manufacturing a 3D MEMS optical switch," Proc. of SPIE, vol. 7204; W. C. Dickson, B. P. Staker, G. Campbell and W. C. Banyai, "64×64 3D-MEMS switch control system with robustness to MEMS resonant frequency variation and pointing drift," OFC'04 Technical Digest, ThQ5, 2004; and A. Fernandez, B. P. Staker, W. E. Owens, L. P. Muray, J. P. Spallas, W. C. Banyai, "Modular MEMS Design and Fabrication for an 80×80 Transparent Optical Cross-Connect Switch," Proceedings of SPIE, vol. 5604, pp. 208-217. provide more background and details on technological aspects for the design, fabrication, testing and manufacturing of 64×64 and 80×80 3D-MEMS switch fabrics. The following question is specifically addressed in Dickson et al: how fast can a MEMS optical switch control system really be? Experimental results correspond to a 64×64 3D-MEMS and reports switching times tightly distributed around the mean value 9 ms and always under 20 ms. Dickson et al found this consistent with the duration of resonant frequencies 300, 375 and 450 Hz used in the MEMS control system. An actual example of a possible whole-fiber cross-connecting technology is that in http://www.glimmerglass.com/documentbank/Glimmerglass_Product_Overview.pdf. Devices described there switch (for example) 24 or 48 whole single-mode fibers (1270 to 1630 nm) in 20 ms with 2.2 dB insertion loss and high optical return loss. The devices also include input and output power monitoring which could be used to activate p-cycle switching actions. (For reference, the three papers listed above are all downloadable from glimmerglass.com.)

It is not awkward to envisage configuring glass switched p-cycles, using commercially available whole fiber cross-connects with fast switching times and low insertion losses. Because the technology for switching whole fibers is much older and "lower-tech" than for DWDM switching, it is reasonable to expect that small glass-switching cross-connects, or even simply three-port glass switching devices to serve as p-cycle nodes, would be very much lower in cost that the corresponding number of DWDM channel ports on a DWDM wavelength path switching cross-connect. As a thought experiment, say that a fiber is carrying even just 10 wavelength channels, which all have to be rerouted following a failure. To replace the glass fiber (in each direction) requires two fiber interface ports and one glass-switch crosspoint. No optical filters, demultiplexers or combiners are needed. To do the same function at the DWDM layer requires (with a transparent optical switch) two fiber interface ports, optical demultiplexer, 10 DWDM qualified optical switchpoints, and optical re-multiplexing plus wavelength selective optical filters as the technology requires. It follows that because even the one whole-fiber switch is a simpler technology than each of the ten DWDM crosspoints, and even overlooking the optical mux/demux requirements of the DWDM switch, that the whole-fiber switch stands the prospects of being ~10× less costly than the DWDM switch for the same function. Both options require remote telemetry and control, but again the glass fiber switch requires one command rather than ten. The DWDM layer may be waveband switched, which alters the argument, but on the other hand it is restored again if the fiber is bearing not 10 but 100 channels in ten wavebands, and so on.

An ILP for Whole Fiber p-Cycles

In this section, we discuss several integer-linear-programming (ILP) mathematical models for the design of glass switched p-cycles for fully transparent networks. The following definitions serve for upcoming mathematical formulations:

Sets:

N is the set of nodes in the network, indexed by k.

S is the set of spans in the network, indexed by i for failing spans and j for surviving spans or spans in general.

D is the set of demand-pairs, indexed by r.

P is the set of candidate cycles, determined by a pre-processing method and indexed by p.

B is a set indexed by b and differentiating the two sides of a given cycle p under span failure conditions. For on-cycle span failures however, one of those sides is considered unusable; this is in recognition that a p-cycle cannot offer more than one restoration route for on-cycle failure events.

C is the set of optical frequencies (i.e., wavelengths) available in a given fiber optic; this is indexed by l.

F is the set of fibers potentially available for a span; and indexed by f.

Input Parameters:

$d^r$ is the number of units of capacity for demand-pair r.

$C_j$ is the length of span j; in km.

$\delta_j^r \in \{0,1\}$ encodes spans across the working route for demand-pair r. $\delta_j^r=1$ if working paths for demand-pair r cross span j en route, and $\delta_j^r=0$ otherwise.

$\epsilon_k^j \in \{0,1,2\}$ encodes spans' terminating nodes: $\epsilon_k^j=0$ if k is one of the end-nodes of span j, $\epsilon_k^j=0$ otherwise.

$x_i^p \in \{0,1,2\}$ encodes the number of restoration routes that the cycle structure p may provide to span i; $x_i^p=2$ if i straddles p, $x_i^p=1$ if p crosses i and $x_i^p=0$ otherwise.

$\tau_{i,j}^{p,b} \in \{0,1\}$ encodes spans across protection route-segments provided by a given p-cycle p to a failed span i. $\tau_{i,j}^{p,b}=1$ if side b of p-cycle p crosses span j with regard to the failure of span i, and $\tau_{i,j}^{p,b}=0$ otherwise.

$W_f$ is the total of number of wavelengths per fiber, constant.

$\kappa_f$ is the maximum number of fiber ports per node, constant.

$L_{max}$ is the absolute length limit for optical paths either in the normal or in the restored network states.

$M_\infty$ is a suitable large constant that serves as a surrogate for infinity.

$I_{node}$ is a constant giving the length-equivalent insertion loss of each node en route to any path.

Decision Variables:

$w_i$ relates to whatever routing process employed for the demand matrix; integer. This is the number of working fibers that are placed on span i in the design, and to be protected with effective sets of whole-fiber p-cycles.

$s_j$ is the number of dark fibers placed on span j in the design; integer. This is derived from the number of (copies of) whole-fiber p-cycles crossing that span.

$n^p$ is the number of whole-fiber copies of p-cycle p in the design; integer.

$\theta_{f,l}^{r,j} \in \{0,1\}$ indicates whether wavelength l on which fiber f of span j is assigned to demand-pairs r in the design.

$\varsigma_{f,i}^{p,b} \in \{0,1\}$ indicates if side b of p-cycle p is assigned to fiber f in order to prevent span i failures.

$L_r$ records end-to-end path lengths in the normal network state, for units of demand-pair r.

$L_{r,i,f}$ defines end-to-end optical lengths in the restored state, i.e. surviving portions plus restoration route-segments. This is for the units of demand-pair r using fiber f on span i in normal operations; and thus using the same side of the same p-cycle in the event of span i failure.

ILP Formulations:

In experiments to follow, glass switched p-cycles are implemented to enhance design efficiency in a fully transparent context. Eqs. (1) to (16) define an ILP mathematical design model belonging to glass switched p-cycles in a fully transparent context. There are three main aspects of which is a simple adaptation of the conventional p-cycle minimum capacity design problem; while another relates to wavelength continuity aspects in the normal network state; and the third is for optical length control in both normal operations and in the network restored state.

More specifically, Eq. (2) assigns wavelengths and fibers to working paths (on each span crossed on the way to destination), and Eq. (3) guarantees a given working path will keep the same wavelength en route (i.e., wavelength continuity) for transparency purposes. Eq. (4) is to make sure that each specific wavelength (i.e., optical frequency) is used no more than once into every fiber optic; while Eq. (5) is to not exceed the number of wavelengths available into fiber optics. Note that while original working paths are still required to keep same wavelengths en route, whole fiber p-cycle architectures eliminate wavelength continuity constraints in the restored network state.

$$\text{Minimize} \sum_{j \in S} (w_j + s_j) \quad (1)$$

Subject to:

$$\sum_{f \in F, l \in C} \theta_{f,l}^{r,j} \cdot \delta_j^r = d^r, \forall r \in D, \forall j \in S. \quad (2)$$

$$\theta_{f,l}^{r,j} \leq \sum_{f' \in F} \theta_{f',l}^{r,i}, \forall r \in D, \forall j \in S, \forall i \in S, \quad (3)$$

$\forall f \in F, \forall l \in C : i \neq j$ and $\delta_j^r = 1$ and $\delta_i^r = 1$.

$$\sum_{r \in D} \theta_{f,l}^{r,j} \cdot \delta_j^r \leq 1, \forall j \in S, \forall f \in F, \forall l \in C. \quad (4)$$

$$\sum_{r \in D, l \in C} \theta_{f,l}^{r,j} \cdot \delta_j^r \leq W_f, \forall j \in S, \forall f \in F. \quad (5)$$

Eq. (1), and Eqs. (6) to (9) somehow relate to the conventional p-cycle minimum capacity design problem, with the difference that variables wj and sj now refer to whole fibers instead of channel capacities (i.e. wavelengths) on span j, as is usually considered. Accordingly, Eq. (6) helps to identify working fibers onto edges, and Eq. (7) derives corresponding wj. Eq. (8) indicates spare capacities, i.e. dark fibers, to be placed on edges. From practical perspectives, it is generally the case that nodes have a limited number of fiber ports. Eq. (9) is to constrain fiber ports under the maximum number allowed per node. The objective function in Eq. (1) is to minimize total working and dark fibers required in the design.

$$\Delta_{j,f} \cdot M^\infty \geq \sum_{r \in D, l \in C} \theta_{f,l}^{r,j} \cdot \delta_j^r, \forall j \in S, \forall f \in F. \quad (6)$$

$$w_j = \sum_{f \in F} \Delta_{j,f}, \forall j \in S. \quad (7)$$

$$s_j = \sum_{p \in P: x_j^p = 1} n^p, \forall j \in S. \quad (8)$$

$$\sum_{j \in S: \epsilon_k^j > 0} (w_j + s_j) \leq \kappa_f, \forall k \in N. \quad (9)$$

Another obvious requirement of full transparent networks is to keep optical path lengths under the diameter of the transparent domain. This topic is widely treated in previous research on p-cycle network design with controlled optical path lengths in the restored network state. One of the ILPs, which is of great interest for upcoming experimental cost modeling specifications, was aimed at constraining optical paths under given absolute length limits. Constraints (10) to (16) are adapted from that ILP model for combination with prior Eqs. (1) to (9), if configuring whole fiber switched p-cycles within a limited diameter for transparency purposes.

Eq. (10) assigns protection segments to working fibers with regard to possible span failure scenarios. While doing, Eq. (11) guarantees the existence of those protection routes; the pertinence is that under on-cycle span failure conditions, there is only one restoration route within the p-cycle under consideration. Eq. (12) constrains the number of path-segments handling span failures in a given p-cycle to not exceed the number of unit copies of every cycle that is available in the design. Eqs. (13) and (15) record statistics on working and resulting restored state path lengths. And Eqs. (14) and (16) set a specific length limit for optical paths in the normal and in the restored network states. (Note: there is no need for a strict full span restoration constraint among Eqs. (6) to (9), as Eq. (12) is doing the job.)

$$\sum_{p \in P; b \in B} \varsigma_{f,i}^{p,b} \cdot \Delta_{i,f} = 1, \forall i \in S, \forall f \in F. \tag{10}$$

$$\varsigma_{f,i}^{p,b} \cdot \Delta_{i,f} \leq \sum_{j \in S: j \neq i} \tau_{i,j}^{p,b}, \forall i \in S, \forall f \in F, \forall p \in P, \forall b \in B. \tag{11}$$

$$n^p \cdot x_i^p \geq \sum_{f \in F, b \in B} \varsigma_{f,i}^{p,b} \cdot \Delta_{i,f}, \forall i \in S, \forall p \in P. \tag{12}$$

$$L^r = \sum_{j \in S: \delta_j^r = 1} (I^{node} + C_j) - I^{node}, \forall r \in D, \forall q \in Q^r. \tag{13}$$

$$L^r \leq L_{max}, \forall r \in D. \tag{14}$$

$$L_{r,i,f} = \varsigma_{f,i}^{p,b} \cdot \left[ \sum_{\substack{j \in S: j \neq i \\ \& \ \tau_{i,j}^{p,b} = 1}} (I^{node} + C_j) + L^r - C_i \right], \tag{15}$$

$$\forall r \in D, \forall i \in S, \forall p \in P, \forall b \in B, \forall f \in F : \delta_i^r = 1.$$

$$L_{r,f,i} \leq L_{max}, \forall r \in D, \forall q \in Q^r, \forall i \in S, \forall p \in P, \forall b \in B : \delta_i^r = 1. \tag{16}$$

Supporting Results

The aim of this section is to compare, from the real network cost perspective, whole fiber p-cycle protection architectures with wavelength switched p-cycle configurations within opaque, hybrid or transparent optical domains. Cost modeling and evaluation follow the standardized model for capital expenditures (CAPEX) in WDM optical layers, of which detailed equipment pricing is given in Gunkel et al and Huelsermann et al.

Cost Modelling

Figure 4:
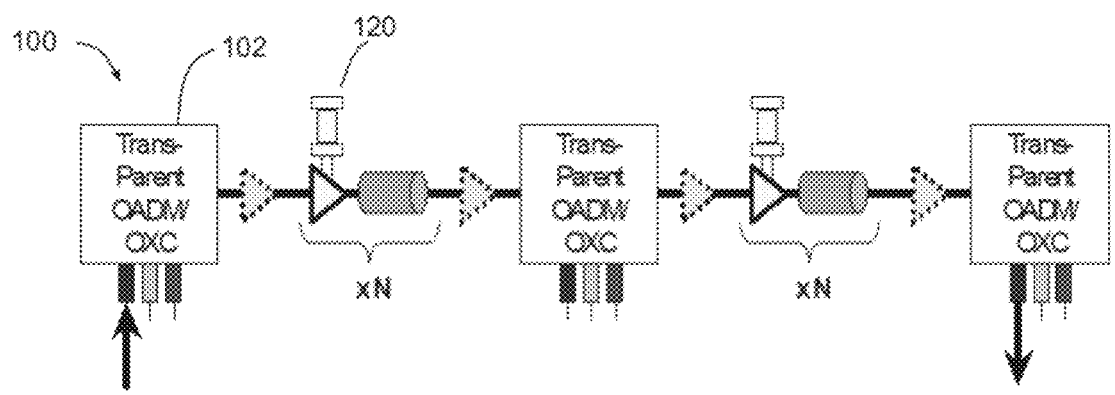
FIG. 4 shows a transparent optical path under the CAPEX model.

FIG. 4 shows a transparent optical path under the CAPEX model. There are three equipment cost levels: nodal, span and transmission. Every node 100 consists of a transparent optical cross-connect (OXC) 102 coupled with an electrical switch (EXC) 104 (not shown in FIG. 4). A given OXC is priced on the basis of wavebands supported by its incident fiber optics. In the experiments conducted, we assumed 40 wavelengths per fiber optic. Corresponding CAPEX costs are 11.8 if f=2; 5.35*f+2 if 5≥f≥3; and 5.85*f+2 if 10≥f≥6; with f representing the number of working fiber-ports available (used) onto the OXC. Costs of ports for protection fibers follow the same distribution, but with savings of 90% over that of working fiber-ports. To complete nodal pricing equipment, FIG. 4 shows that ingress and egress lightpaths are amplified at the entrance/exit of OXCs. A node amplifier 120 is subsequently required for any incident bidirectional fiber, and the cost incurred is 1.25.

Besides ports for optical switching, the EXC switch 104 also provides electronic ports 130 for o-e-o operations; this costs 0.28 a unit. To calculate the number of EXC ports required in the design, let us look at FIGS. 5A, 5B and 5C.

Figure 5A:
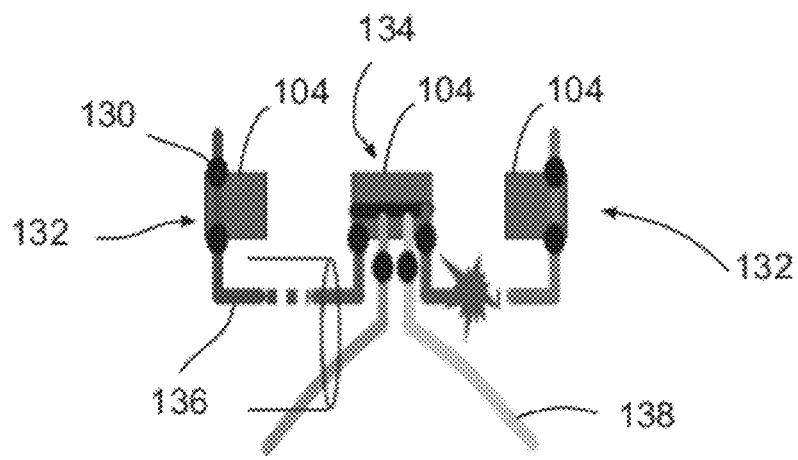
FIGS. 5A, 5B and 5C show possible configurations of wavelength switched p-Cycles for WDM Layers, FIG. 5A being opaque, FIG. 5B being hybrid and FIG. 5C being transparent.
Figure 5B:
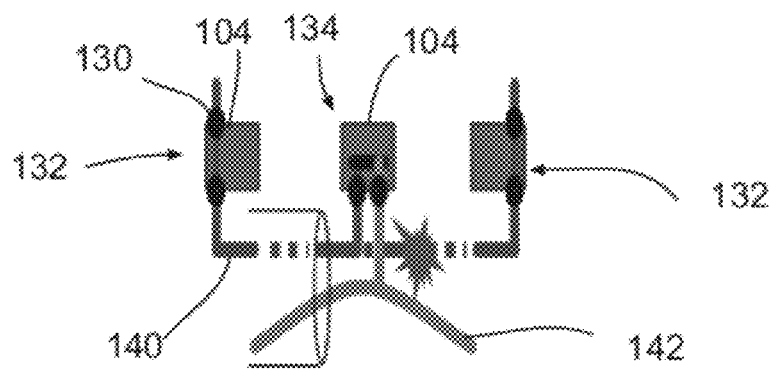
Figure 5C:
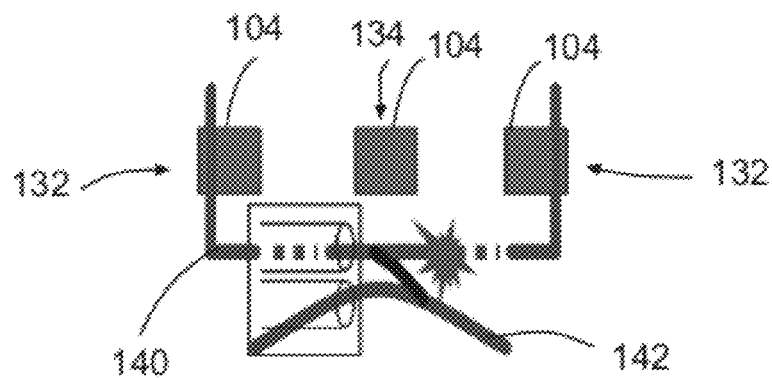

As shown in FIG. 5A, for any opaque lightpath 136, one EXC port is required at each of the end-nodes 132 to enter/leave the optical domain; and two other EXC ports are required at every intermediate node 134 to access the next span on which it will probably ride onto another wavelength. For the same reasons, opaque p-cycles 138 will also require two EXC ports at every node crossed en route. Nevertheless hybrid architectures assume transparent working paths 140 and transparent p-cycles 142, one EXC is still required at every node crossed by a working path to be able to switch onto the protecting structure in the event of failures. In the same order of ideas, cycles will need one EXC port at access points for on-cycle span protection; this increases to two ports for nodes handling straddling traffic because two paths simultaneously require access.

In both wavelength and glass switched transparent networks, there is no need for EXC ports as no wavelength conversion is now required, neither for working paths nor for protecting cycle structures nor to access those cycles.

The series of transmission costs is completed with two transponder line cards for add/drop operation; one transponder at the origin and the other at the destination node of any lightpath and in any configuration. Transponder prices depend on the maximum transmission distance (MTD), i.e. maximum path length in the normal or in the restored network state. CAPEX model indicates costs of 1 for MTDs of

TABLE 1

SUMMARY OF RESULTS

| p-Cycle Related Configurations | Nodal Costs | Span Costs | Transmission Costs | Real Network Cost | Fiber Utilization (max, avg) |
|---|---|---|---|---|---|
| Opaque | 373.9 | 224.602 | 574 | 1172.502 | (55%, 28.84%) |
| Hybrid | 373.9 | 258.115 | 598 | 1230.01 | (70%, 31.34%) |
| Transparent | 561.3 | 371.55 | 204.4 | 1137.25 | (85%, 47.82%) |
| Glass Switching | 449.89 | 261.646 | 198.8 | 910.336 | (50%, 19.30%) |

750 km, 1.4 for MTDs of 1500 km and 1.9 for MTDs of 3000 km.

The last pricing level pertains to span equipments. Span costs are of three types: dispersion compensating fiber (DCF) per 80 km span, inline amplifiers (IA) per 80 km span, and dynamic gain equalizer (DGE) every fourth amplifier site. DCF and IA costs are also based on the MTD, which is now the longest working or protection path crossing the span in question. CAPEX costs are: 0.9 and 3 for MTDs of 750 km, 1 and 3.8 for MTDs of 1500 km, 1.2 and 4.7 for MTDs of 3000 km, for DCF and IA respectively. DGE price is a constant equal to 3.

Cost Evaluation

Figure 6:
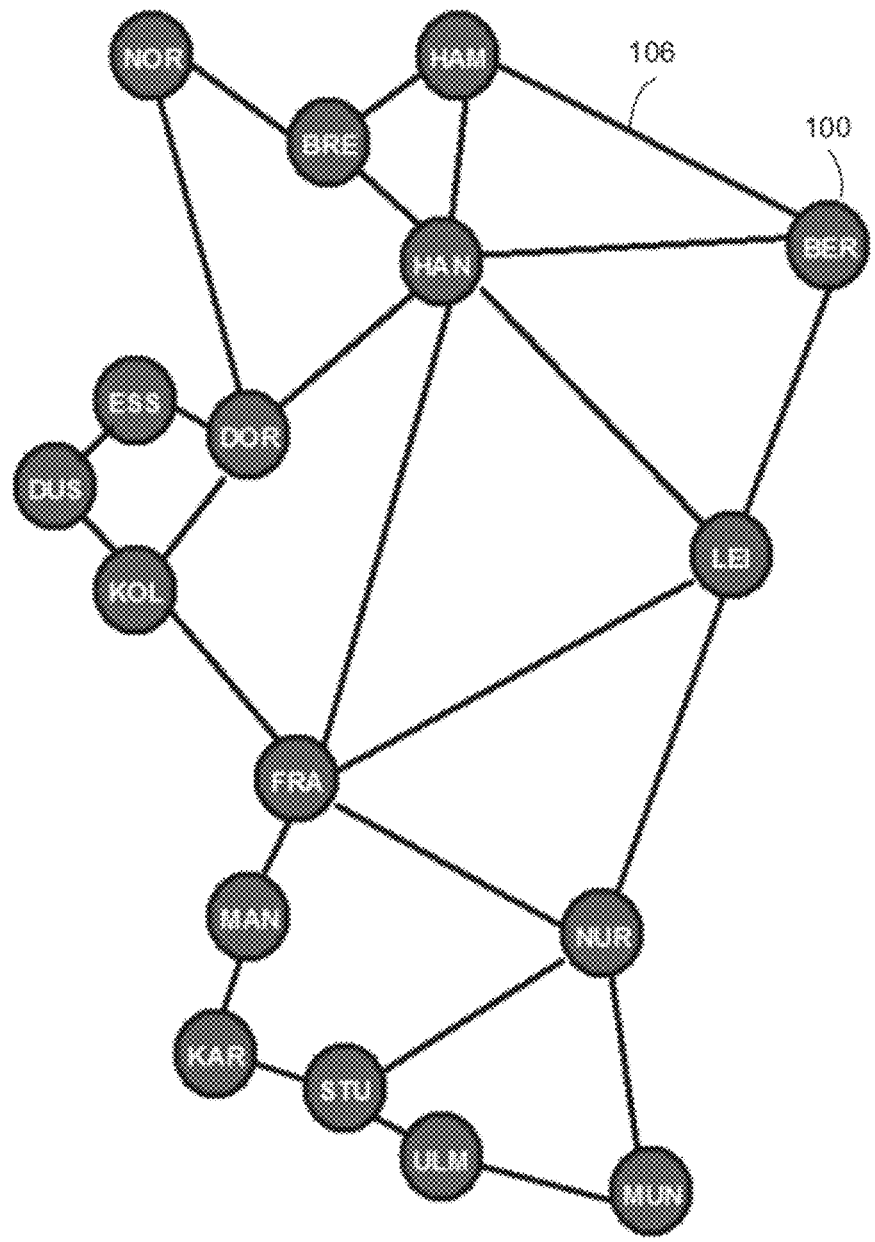
FIG. 6 shows a German test case network.

This section by itself reproduces some results of A. Grue, W. D. Grover, M. Clouqueur, D. Schupke, D. Baloukov, D. P. Onguetou and B. Forst, "Application of a Standardized WDM Layer Cost Model to Restorable Networks: Designs at Low Demand Volume," 34th Edition of the European Conference on Optical Communication (ECOC'08), Brussels, Belgium, 21-25 Sep. 2008; and A. Grue, W. D. Grover, M. Clouqueur, D. Schupke, D. Baloukov, D. P. Onguetou and B. Forst, "CAPEX Cost of Lightly Loaded Restorable Networks under a Consistent WDM Layer Cost Model," Proceedings of the IEEE International Conference on Communications (ICC'09), Dresden, Germany, 14-18 Jun. 2009, but with more details on p-cycle cost optimizations and more discussion on p-cycle specific configuration issues. The network under study is the German graph of 17 nodes and 26 spans shown in FIG. 6. Average nodal degree is about 3.06 and there is a total of 135 candidate cycles. The traffic matrix consists of 58 demand-pairs with units distributed on the interval [0 . . . 5]. And a shortest distance-weighted routing is performed under normal operations. (The German test case network was previously used as master topology in A. Grue, W. D. Grover, M. Clouqueur, D. Schupke, J. Doucette, B. Forst, D. P. Onguetou and D. Baloukov, "Comparative Study of Fully Pre-cross-connected Protection Architectures for Transparent Optical Networks," in Proceedings of the Sixth International Workshop on the Design of Reliable Communication Networks (DRCN'07), La Rochelle, France, 7-10 Oct. 2007, to which readers may want to refer for more details.)

Experimental results are reported in Table 1 with details on nodal, span, transmission and overall costs; each of them using one column in the table. Fiber utilization is also indicated. Row entries depend on whether the WDM layer is fully opaque, requires partial wavelength conversion, or is fully transparent. Former cases assumed an optical switching based on the wavelength level of granularity while the latter also considers whole fiber p-cycle protection architectures. In transparent and hybrid related cases, the design was done under controlled optical lengths to match the maximum MTD considered in the CAPEX equipment-pricing model; limits of 3000 km is adopted.

Nodal costs in the 2nd column of Table 1 are much higher in both wavelength and fiber switched transparent architectures, than in hybrid and opaque cases. This is because former require fibers specifically dedicated for protection while the latter carries working and spare channels into the same fibers. On the other hand, there is still a significant reduction of that cost with whole fiber switches in which protection (i.e. dark) fiber-ports save 90% over the cost of working ones.

Span costs are mainly influenced by MTDs. Because of o-e-o conversion is permitted at every node crosses en route for any signal traveling in an opaque network, either in the normal or in the restored states, MTDs are directly defined by span lengths. This probably corresponds to MTDs of 750 km for the German opaque network instance; so related performance is much better than the others from the span cost perspective. In hybrids, MTDs are based on longest working paths or protection segments; and span costs increase slightly accordingly.

Transparent designs where signals remain into the optical domain till their destination have higher span cost requirements; but the glass switching performance is still almost equivalent to that of the hybrid configuration. Furthermore transparent architectures compensate the poor performance at nodal and span pricing levels when arising to transmission equipments. With no EXC port needs, transmission costs are in fact almost three times less than in hybrid and opaque design cases.

Overall, whole fiber p-cycle performance is much better than that of any wavelength switched p-cycle configuration, but with less ratio of fiber utilization. The latter can however constitute a significant advantage for dynamic traffic considerations such as forcer analysis or protected working capacity envelop (PWCE) concepts.

Whole Fiber Cross-Connect Switches

In the past, glass-switching fabrics used to be very slow in practice (1 s or more), bulky, expensive and typically limited to 16×16 or 2×48 matrix sizes. Recent developments in the fiber optic industry gave rise to a new generation of whole fiber switches that offer the intended capability (i.e., the ability to switch optical signals transparently and independently of data rates, formats, wavelengths, protocols and services) with faster switching times, more compact form-factors and larger matrix sizes.

Actual State-of-the-Art Whole Fiber Cross-Connect Devices

Actual commercial examples of whole fiber cross-connect switches are available at glimmerglass.com. Technological solutions relate to micro-electro-mechanical system (MEMS) optical switches, which utilize micro-mirrors to switch or reflect a given optical signal from one fiber to another depending on the relative angle of the micro-mirror. Such an operating principle allows a given MEMS to switch many optical channels in a relatively small amount of space. For instance, the product family at glimmerglass.com uses MEMS micro-mirrors to transparently interconnect matrices of 24×24 to 192×192 single mode fibers. All SONET/SDH, Ethernet, digital and analog signal formats are supported, with traffic data rates reaching up to OC-768, 10GE and DWDM. References E. Carr, P. Zhang, D. Keebaugh, K. Chau, Cost-Effective Method of Manufacturing a 3D MEMS Optical Switch, in: Proceedings of SPIE, Vol. 7204; W. C. Dickson, B. P. Staker, G. Campbell, W. C. Banyai, 64×64 3D-MEMS Switch Control System with Robustness to MEMS Resonant Frequency Variation and Pointing Drift, Technical Digest ThQ5, OFC (2004); and A. Fernandez, B. P. Staker, W. E. Owens, L. P. Murray, J. P. Spallas, W. C. Banyai, Modual MEMS Design and Fabrication for an 80×80 Transparent Optical Cross-Connect Switch, in: Proceedings of the SPIE, Vol. 5604, pp. 208-217 provide more details on technological aspects for the design, fabrication, testing and manufacturing of the 64×64 and 80×80 3D-MEMS switch fabrics in glimmerglass.com.

Dickson et al also addresses the question of MEMS optical switch control system speeds. Experimental results specifically report switching times tightly distributed around the mean value 9 ms, with a peak of 20 ms, for a 64×64 3D-MEMS. Such response times are found consistent with the duration of resonant frequencies of 300, 375 and 450 Hz used in the 64×64 3D-MEMS control system. Whole fiber cross-connect devices in http://www.glimmerglass.com/documentbank/GlimmerglassProductOverview.pdf corroborate the 20 ms (or less) switching time expectations, with 2.2 dB insertion loss and high optical return loss, and for matrix sizes are of 24 and 48 whole single mode fibers (1270 to 1630 nm). From another perspective, whole fiber cross-connect devices in http://www.glimmerglass.com/documentbank/GlimmerglassProductOverview.pdf include input and output power monitoring which could be used to activate p-cycle switching actions. Pursuing the idea of glass switched p-cycles is not utopian if considering actual commercially available whole fiber cross-connects, with fast switching times and low insertion losses.

Hypothetical Cost Reduction

Because the technology for switching whole fibers is much older and "lower-tech" than that for DWDM switching, it is reasonable to expect that small glass-switching cross-connects, or even simply three-port glass switching devices serving as p-cycle nodes, would be very much lower in cost than the corresponding number of DWDM channel ports on a DWDM wavelength path switching cross-connect. Hypothetically, say that a fiber is carrying even just 10 wavelength channels, which all have to be rerouted following a failure. To replace the glass fiber (in each direction) requires two fiber interface ports and one glass-switch crosspoint. No optical filters, demultiplexers or combiners are needed. To do the same function at the DWDM layer requires (with a transparent optical switch) two fiber interface ports, optical demultiplexer, 10 DWDM qualified optical switchpoints, optical remultiplexing, and wavelength selective optical filters as the technology requires. Because the one whole-fiber switch is a simpler technology than each of the ten DWDM crosspoints, the whole fiber switch stands the prospects of being ~10× less costly than the DWDM switch for the same function even if we overlook the optical mux/demux requirements of the DWDM switch. Both options require remote telemetry and control, but again the glass fiber switch requires one command rather than ten. The DWDM layer may be waveband switched, which alters the argument, but on the other hand it is restored again if the fiber is bearing not 10 but 100 channels in ten wavebands, and so on.

Complexity Reduction of Fully Transparent p-Cycle ILP Design Models

The following mathematical definitions serve for all ILP design models formulated in this paper.

Sets

S is the set of spans in the network and is indexed by i for failing spans, and j for surviving spans or spans in general.

P is the set of eligible candidate cycles, determined by a pre-processing method and indexed by p-cycle p.

The new symbol D represents the set of demands (indexed by r).

C is the set of wavelengths available into a fiber. All fiber optics across a given network are assumed the same waveband of |C| wavelengths, |C| being the cardinality of set C.

Input Parameters $C_j$ is the cost of each capacity unit on span j. But in upcoming CapEx cost considerations, $C_j$ will also refer to the length of span j.

$w_i$ is the number of working channels (capacity units) to be protected on span i, and which arise from whatever routing of the demand matrix is employed.

$x_i^p \in \{0,1,2\}$ encodes the number of protection route-segments that one unit-sized copy of p-cycle p provides to span i. $x_i^p=2$ if span i straddles p-cycle p, $x_i^p=1$ if span i is on p-cycle p and $x_i^p=0$ otherwise.

$d^r$ is the number of units of capacity for demand relation r.

$\delta_j^r \in \{0,1\}$ indicates spans that each given demand relation r crosses en route; $\delta_j^r=1$ if r crosses j and $\delta_j^r=0$ otherwise. Also, all units for a given demand relation r are assumed to follow the same working route under normal network states.

Decision Variables $s_j$ is the total number of spare channels needed on span j in the design.

$\eta^p$ is the number of unit-channel copies of candidate p-cycle p used in the design.

$F_j$ encodes the number of bidirectional fibers which comprise span j. The decision variable $F_j$ is broken, when needed, into $Fw_j$ and $Fs_j$ in order to separate working and protection fibers in the design.

$\lambda_l^r \in \{0,1\}$ records wavelengths assigned to working routes for demand relation r; $\lambda_l^r=1$ if r uses wavelength l under normal network states and $\lambda_l^r=0$ otherwise.

$\varsigma_l^p \in \{0,1\}$ similarly records wavelengths assigned to cycle structure p in the design; $\varsigma_l^p=1$ if p-cycle p uses wavelength l and $\varsigma_l^p=0$ otherwise.

Decision variables $\lambda_l^r$ and $\varsigma_l^p$ are assumed binary to simplify the ILP formulation. This condition imposes the total number of units for a given demand relation or cycle structure to be less than or equal to the number of wavelengths available into each fiber optic.

An ILP Design for Glass Switched p-Cycles

Equations (17)-(23) comprise an ILP mathematical design model for whole fiber switched p-cycles. The objective function (17) is used to minimize total (working and protection) fiber-kms required in the design. The use of equation (18) assumes an initial routing of demands and then derives the number of working fibers to be protected on spans. The use of equation (19) ensures full span failure restorability, and the use of equation (20) places protection fibers on edges.

$$\text{Minimize} \sum_{j \in S} (F_{w_j} + F_{s_j}) \cdot C_j \quad (17)$$

$$F_{w_j} \geq \frac{w_j}{|C|}, \forall j \in S \quad (18)$$

$$F_{w_i} \leq \sum_{p \in P} (x_i^p \cdot \eta^p), \forall i \in S \quad (19)$$

$$F_{s_j} = \sum_{p \in P, x_j^p = 1} \eta^p, \forall j \in S \quad (20)$$

Whole fiber protection eliminates wavelength continuity constraints in the restored network state only. But, in a fully transparent context, glass switched p-cycle designs still require constraints to keep the same wavelengths across original working paths. Thus, equations (21), (22) and (23) are used to allocate wavelengths to working paths, to make sure that each specific wavelength is uniquely assigned into any fiber optic, and to not exceed the number of fibers available onto each given span.

$$\sum_{l \in C} \lambda_l^r = d^r, \forall r \in D \quad (21)$$

$$\sum_{r \in D} \lambda_l^r \cdot \delta_j^r \leq F_{w_j}, \forall j \in S, \forall l \in C \quad (22)$$

$$\sum_{r \in D, l \in C} \lambda_l^r \cdot \delta_j^r \leq F_{w_j} \cdot |C|, \forall j \in S \quad (23)$$

Complexity Enhancements

One way to measure the computational complexity of an ILP mathematical design model is to assess the number of variables and constraints manipulated in specific ILP-related instances. Considering the above ILP design model for whole fiber switched p-cycles, the statistic exercise is performed as follows.

Constraints: The objective function (17), which is specific to no index, contributes for 1. Given that each of equations (18), (19), (20) and (21) is defined for every span within the network (i.e., $\forall j \in S$), each of those equations involves |S| constraints (|S| being the cardinality of set S). Likewise, equation (21) stands for each demand relation (i.e., ∀r∈D) and accordingly generates |D| constraints; while equation (22) is defined for every span and any wavelength available into a given fiber (i.e., ∀∈S & ∀∈C), thus generating |S|×|C| constraints. The total number of constraints in the ILP is equal to: 3×|S|+|P|+|D|+|S|×|D|+|S|×..P|+|D|×|C|.

Variables: Following the same counting principle, input parameters and decisions variables $w_i$, $C_j$, $Fw_j$ and $Fs_j$ involve |S| variables each; while $d^r$ and $\eta^p$, $\delta_j^5$, $x_i^p$ and $\lambda_l^r$ respectively generate to |D|, |P|, |S|×|D|, |S|×|P| and |D|×|C| variables. The total number of variables manipulated in using the ILP is thus given by: 4|S|+|D|+|P|+|S|×|D|+|S|×|P|+|D|×|C|.

Figure 7A:
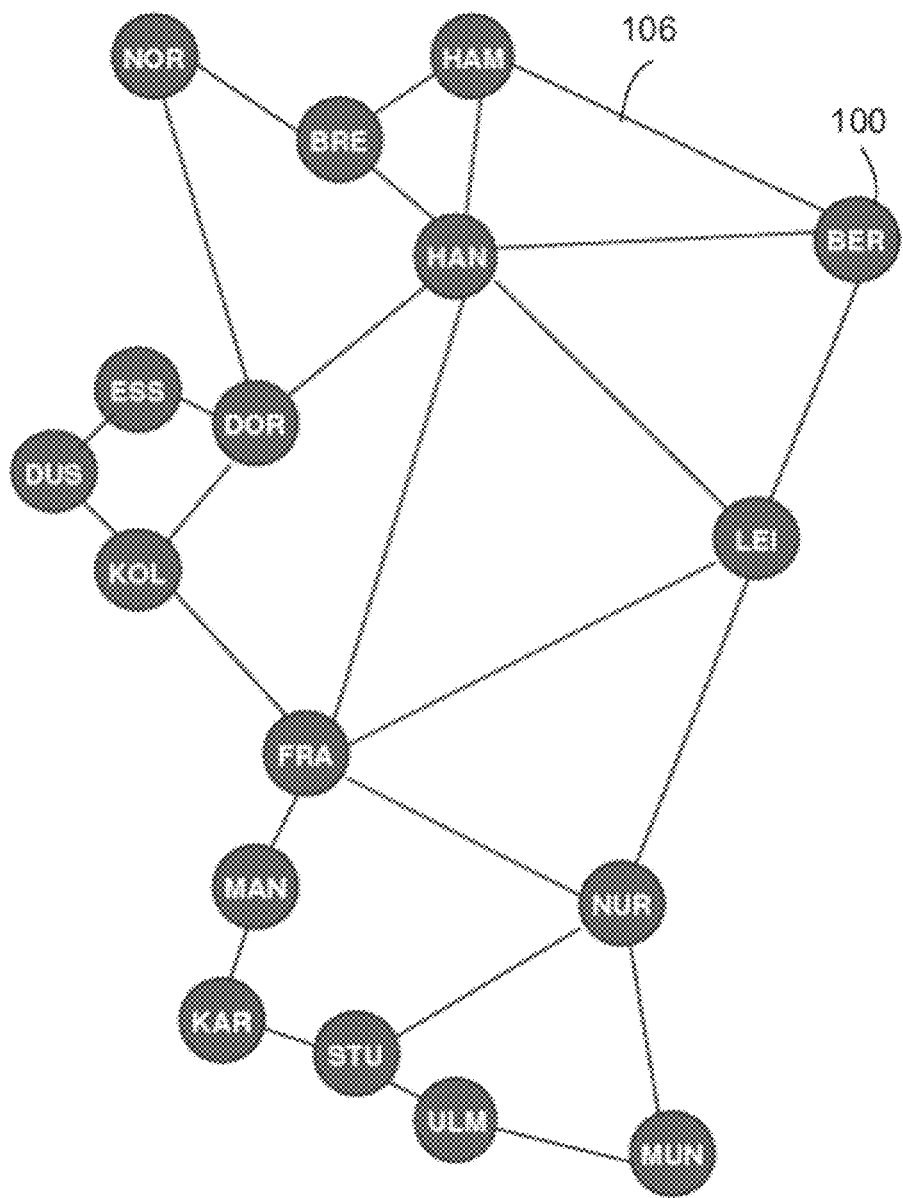
FIG. 7A shows the Havana test case network.
Figure 7B:
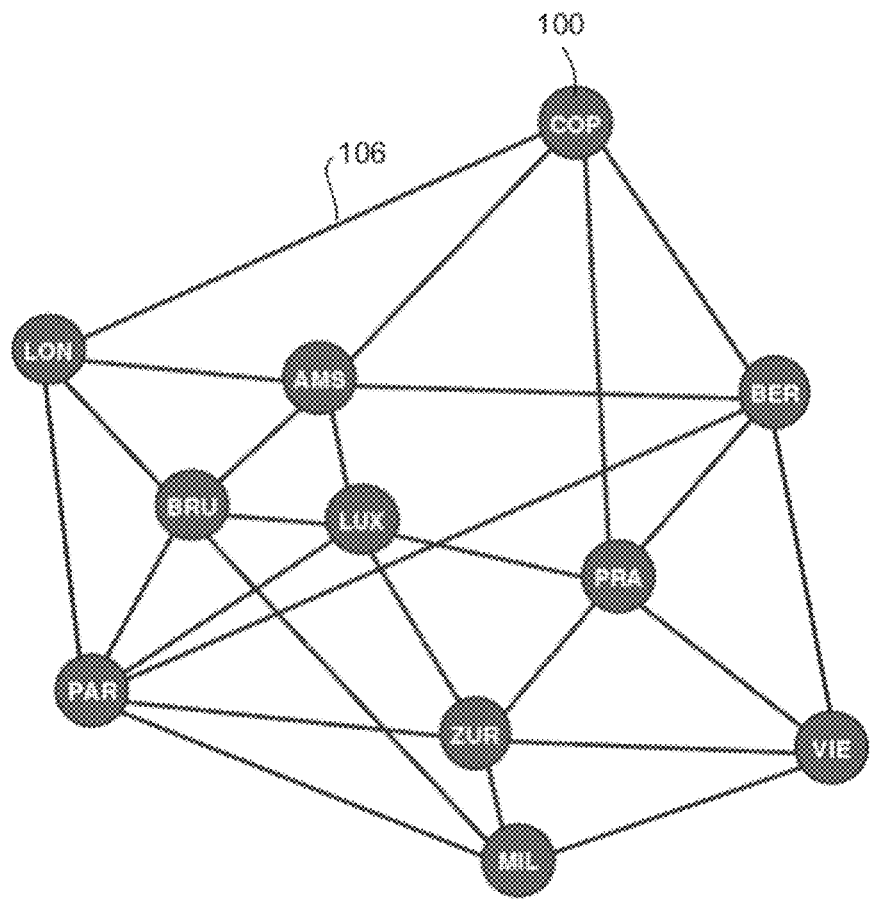
FIG. 7B shows the Cost239 test case network.
Figure 7C:
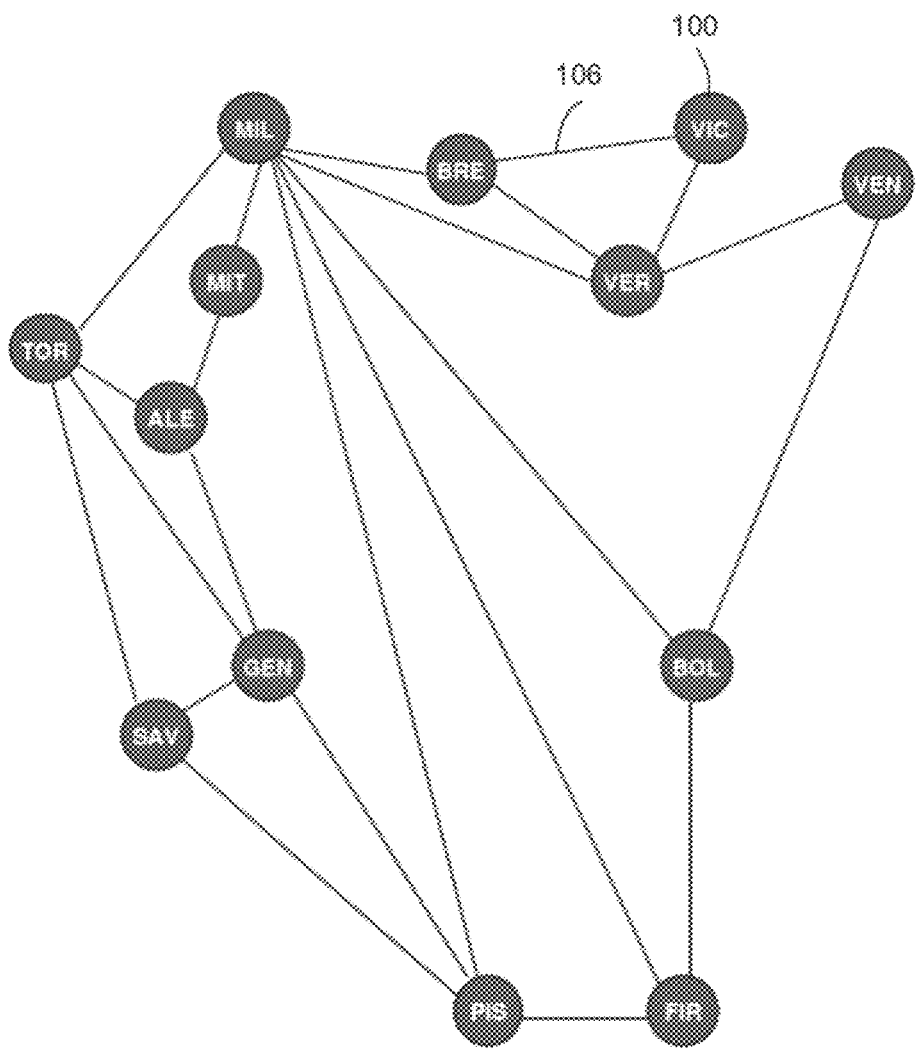
FIG. 7C shows the Italy test case network.
Figure 7D:
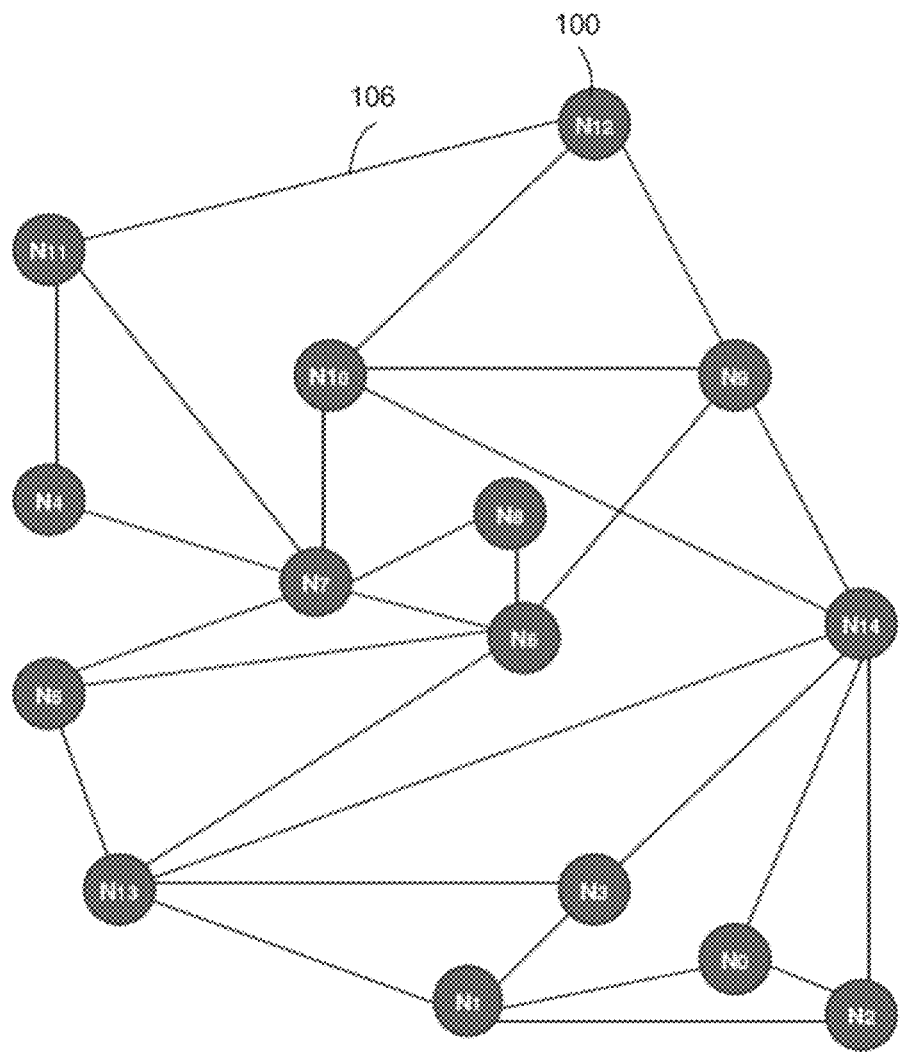
FIG. 7D shows the Bellcore test case network.
Figure 7E:
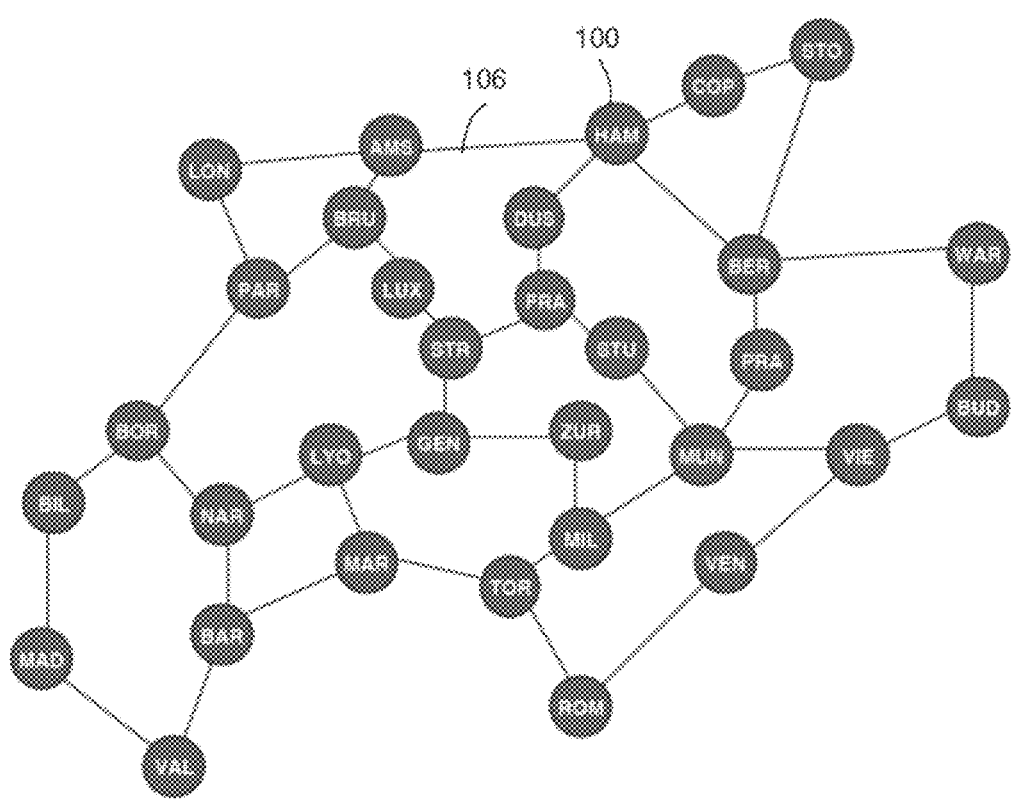
FIG. 7E shows the Euro test case network.

Variables and constraints involved in wavelength and glass switched p-cycle ILPs were counted for the network graphs in FIGS. 7A-7E. Havana in 7A is a previously used network; two sets of demands are considered for it: the original matrix of 58 demand-pairs with units distributed on the interval [0 . . . 5], and another traffic matrix assuming connection requests between every single pair of nodes, with volumes uniformly distributed on the interval [1 . . . 100]. The 2nd network in FIG. 7B is the well-known Cost239 pan-European network; related traffic matrix includes 55 nonzero demand-pairs uniformly distributed on [1 . . . 10]. The other test case instances are given in FIGS. 7C, 7D and 7E: the Italy network has 78 demand-pairs distributed on [1 . . . 10], the Bellcore network has 104 demand-pairs distributed on [1 . . . 20], and another European network has 323 demand-pairs distributed on the interval [1 . . . 2]. A shortest distance based routing is typically applied under normal network states.

TABLE 2

Variables and Constraints Involved in Wavelength and Glass Switched p-Cycle ILPs

| Test Case Networks | Conventional p-Cycle ILP | Wavelength Switched p-Cycles | | | ILP for Glass Switched p-Cycles |
|---|---|---|---|---|---|
| | | Opaque ILP | Hybrid ILP | Transparent ILP | |
| Havana | | | | | |
| (i) original | | | | | |
| constr. only | 53 | 79 | 1,338 | 2,430 | 1,203 |
| var. & constr. | 3,776 | 3,828 | 14,373 | 15,491 | 8,838 |
| (ii) more traffic | | | | | |
| constr. only | 53 | 79 | 1,416 | 2,508 | 1,281 |
| var. & constr. | 3,776 | 3,828 | 19,677 | 20,795 | 14,142 |
| Cost239 | | | | | |
| constr. only | 53 | 79 | 4,731 | 5,823 | 1,200 |
| var. & constr. | 95,468 | 95,520 | 245,097 | 246,215 | 100,326 |
| Italy | | | | | |
| constr. only | 49 | 73 | 1,692 | 2,700 | 1,135 |
| var. & constr. | 14,046 | 14,094 | 43,063 | 44,095 | 20,226 |
| Bellcore | | | | | |
| constr. only | 57 | 85 | 2,313 | 3,489 | 1,337 |
| var. & constr. | 28,445 | 28,501 | 76,945 | 78,149 | 36,929 |
| Euro | | | | | |
| constr. only | 85 | 127 | 2,871 | 4,635 | 2,172 |
| var. & constr. | 30,268 | 30,352 | 87,865 | 89,671 | 59,206 |

Table 2 records results for an assumption of 40 wavelengths per fiber. Opaque ILPs involve less variables and constraints than any other p-cycle ILP design model. The use of other ILPs implies many more variables due to wavelength assignment and wavelength continuity constraints, as it provides any form of signal transparency. But the glass switched p-cycle ILP also involves fewer variables and constraints than hybrid and fully transparent wavelength switched p-cycle ILPs, even less than half if applied to Cost239, Italy and Bellcore network instances. The reason is that whole fiber switched p-cycle designs impose wavelength assignment and continuity to working paths only, as the same wavelengths are implicitly used under restored network states. And in contrast, hybrids and transparent wavelength designs require wavelength continuity and wavelength assignment constraints for both working paths and protection structures.

Considering whole fiber switched p-cycles significantly reduces the complexity due to wavelength assignment and wavelength continuity constraints in fully transparent p-cycle designs. In practice, implementing whole fiber switched p-cycles is not utopian using current glass cross-connect switch technology, which is expected to involve much lower costs than corresponding WDM while being as fast as the wavelength switching technology. It remains to study real-world CapEx cost enhancements of whole fiber switched p-cycles vis-à-vis that of wavelength switched p-cycles.

CapEx Cost Enhancements

In pursuing the ultimate goal of reducing overall network costs, most designers directly define cost metrics as capacity requirements in total channel-hops or channel-kms in the design. Does capacity alone correlate real-world CapEx costs? A consistent WDM cost model, comprising all relevant pieces of equipment, is crucial to address such a techno-economic question. However, detailed equipment cost values used to be very hard to derive because of such reasons as confidentiality of actual commercial costs, differentiation of product families among vendors, and learning curves affecting equipment year by year. Several partners in the European research project NOBEL (Next generation of Optical network for Broadband European Leadership recently contributed to and agreed on a normalized cost model for WDM pieces of equipment (M. Gunkel, R. Leppla, M. Wade, A. Lord, D. A. Schupke, G. Lehmann, C. Furst, S. Bodamer, B. Bollenz, H. Haunstein, H. Nakajima, J. Martensson, A Cost Model for the WDM Layer, in: International Conference on Photonics in Switching (PS), Herakleion (Crete), Greece, 2006; and R. Huelsermann, M. Gunkel, C. Meusburger, D. A. Schupke, Cost Modelling and Evaluation of Capital Expenditures in Optical Multilayer Networks, OSA Journal of Optical Networking (JoN) 7 (9) (2008) 814-833, or Gunkel et al and Huelsermann et al respectively).

A CapEx Cost Model for WDM Layers

The NOBEL cost model in Gunkel et al and Huelsermann et al describes a set of normalized CapEx costs for various network elements and node architectures, including all elements required to build a WDM transport network. The following discussion specifically pertains to NOBEL cost derivations for opaque, hybrid and fully transparent (wavelength or glass switched) span-protecting p-cycles.

Protection Switching Issues

Figure 8A:
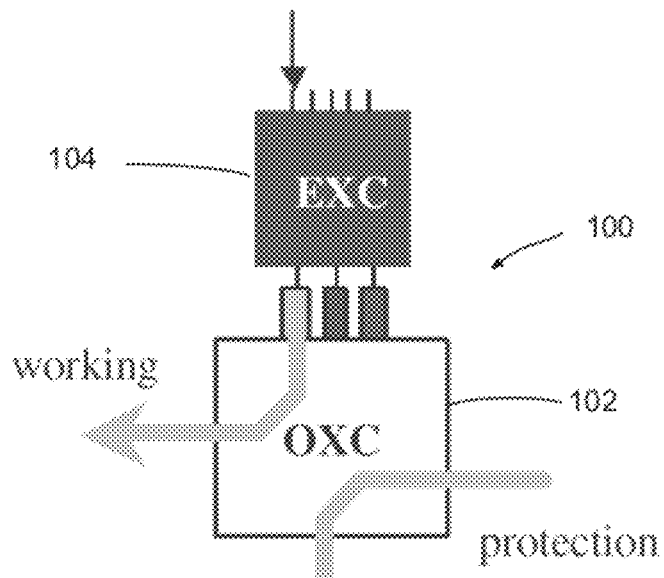
FIG. 8A shows a normal network state at a node for optical switching.
Figure 8B:
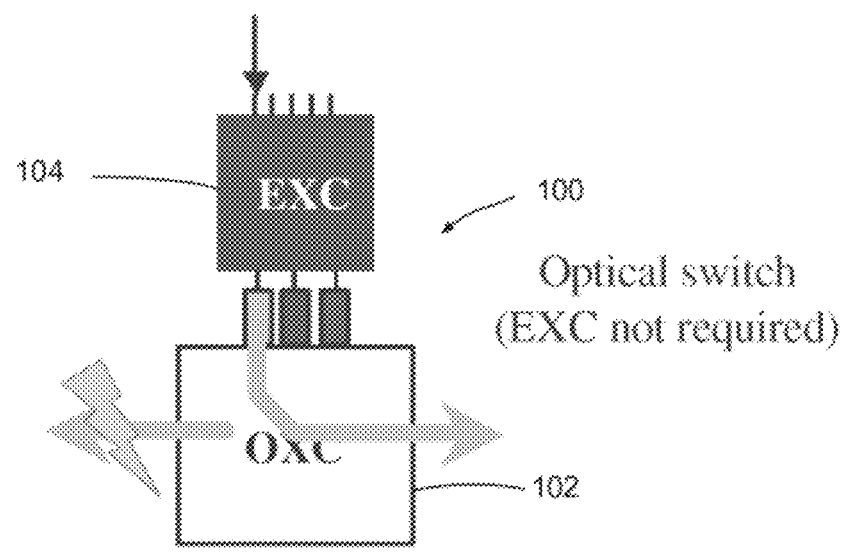
FIG. 8B shows a restored network state at a node for optical switching.

A survivable network enables the switching of optical paths in response to failures. Two types of protection switching are typically considered: optical switching and electrical switching. As shown in FIGS. 8A and 8B, optical protection switching utilizes an OXC 102 to switch an outgoing signal between two different end-to-end concatenated wavelength paths using a single transponder. Such an optical protection switching implies that working and protection paths are both transmitted over the same wavelength of a single tunable transponder card. Also in FIGS. 8A and 8B, optically switched paths completely bypass the electrical cross-connect (EXC) 104. When considering only one end-node of the protected path, optical switching implies the use of one single transponder plus the standard node switching.

Figure 8C:
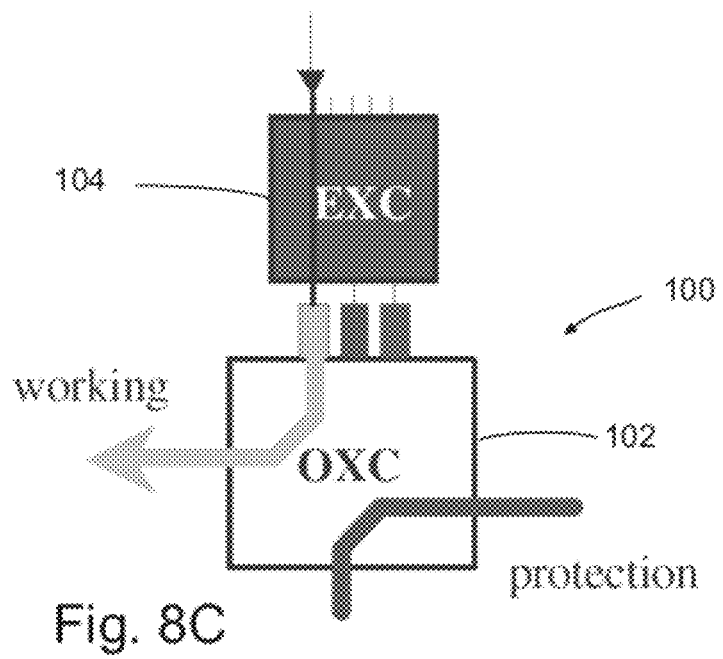
FIG. 8C shows a normal network state at a node for electrical switching.
Figure 8D:
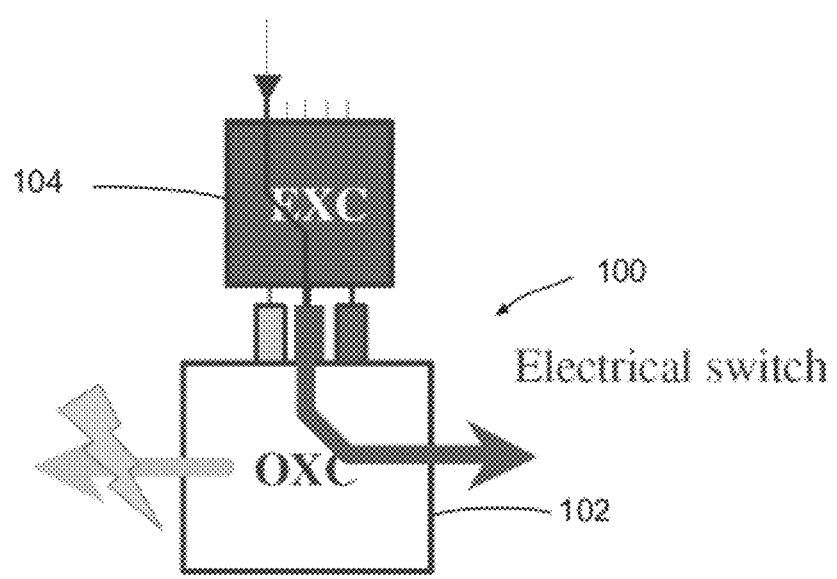
FIG. 8D shows a restored network state at a node for electrical switching.

Tuning the transponder card to a new wavelength using an optical switching is not taken into account because of response time considerations; an electrical switching is used instead. In FIGS. 8C and 8D, an EXC switches the signal in the electrical domain from one transponder to another, meaning that working and protection paths are allowed to use different wavelengths. Enabling electrical switching at one end-node of the protected path requires the use of one working transponder, one protection transponder and three ports on the EXC (one client-side and one for each of the two transponders).

Here are some practical implications of protection switching issues in p-cycle survivable networks. Fully transparent span-protecting p-cycles only require an optical switching at the ingress and egress nodes: two transponder line cards are thus used for add/drop operations, one at the ingress and the other at the egress OXC of any lightpath. This stands whether considering a wavelength or a glass switching granularity level, just replacing the OXC by the whole fiber cross-connect device (in case).

In contrast to fully transparent p-cycle designs, hybrid span-protecting p-cycle configurations require an electrical switching at the entry points of working paths into p-cycles. This involves the use of: three EXC ports and two transponders at each of the ingress and egress nodes of any lightpath; one EXC port and one OXC transponder at every intermediate node along working paths, in order to give to span end-nodes the capability of switching onto the protecting structure in the event of failures); and one EXC port and one OXC transponder at the entry nodes of every p-cycle.

In opaque p-cycles, an electrical switching is required at every node across working paths and p-cycles. Corresponding EXC port and transponder requirements are as follow: three EXC ports and two transponders at each of the ingress and egress nodes for every lightpath, plus two EXC ports and two transponders at every intermediate node along any working path, plus two EXC ports and two transponders at every node crossed by any given p-cycle. Given that a network may contain an aggregate of hundreds of protected wavelength channels/paths, opaque and hybrid p-cycle designs can add up to a large difference in EXC ports and transponders.

Equipment Pricing Under the NOBEL Cost Model

Figure 9A:
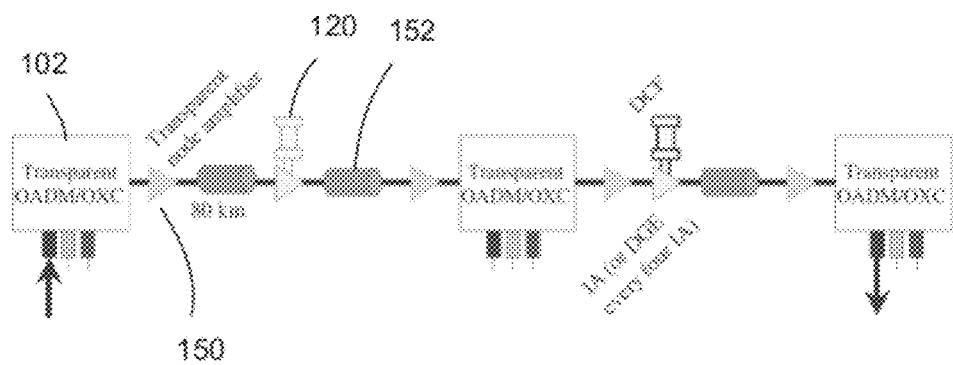
FIG. 9A shows a transparent optical path under the NOBEL cost model for WDM layers.
Figure 9B:
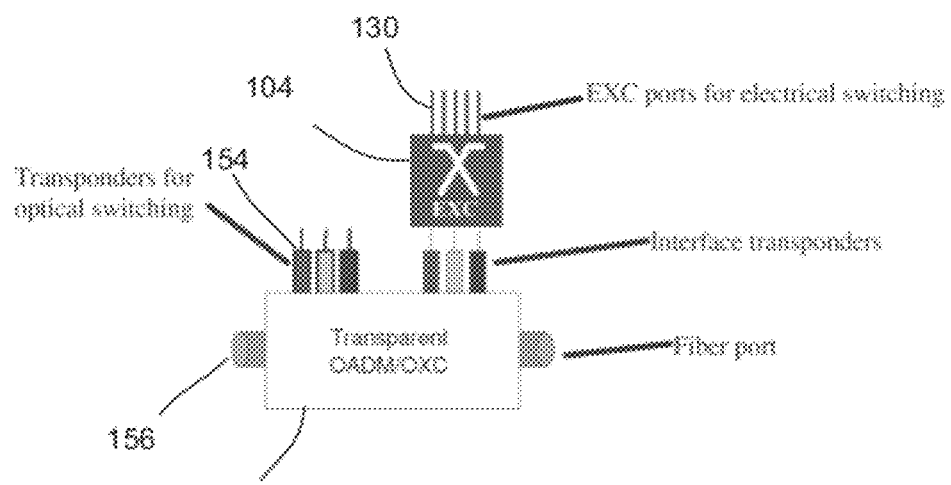
FIG. 9B shows a baseline node architecture under the NOBEL cost model for WDM layers.

FIGS. 9A and 9B presents a consistent transparent optical path under the NOBEL framework. Basic components comprise: transparent cross-connect devices 102 at the ingress, egress and intermediate nodes; a transparent node amplifier 150 at the entrance and at the exit of each transparent node; and between two transparent nodes, an inline amplifier (IA) 120 and a dispersion compensating fiber (DCF) 152 every 80 km plus a dynamic gain equalizer (DGE) every fourth IA.

The node baseline architecture shown in FIG. 9B is selected, from NOBEL elements, to match prior-discussed protection switching requirements. This is a hybrid transparent node that comprises an OXC 102 with transponders 154 and fiber ports 156 coupled to an EXC 104. In this study, the EXC is only considered for protection switching, meaning that no other functionality such as grooming of lower rate traffic is taken into account. Each EXC switching port 130 costs 0.28 when assuming the prevalent data rate of 10 Gbit/s under the NOBEL cost framework.

An OXC is priced on the basis of wavebands supported by its incident fiber optics. Under the assumption of 40 wavelengths per fiber, the NOBEL worksheet indicates costs of 11:8 for OADMs (i.e., OXCs of two incident fibers) and the use of equations (24) and (25) calculates the cost of OXCs of three to five, and six to ten incident fibers.

$$5.35 \times \sum_{j \in S: \mu_j^k=1} F_j + 2, \forall k \in N: 2 < \sum_{j \in S: \mu_j^k=1} F_j \le 5. \quad (24)$$

$$5.85 \times \sum_{j \in S: \mu_j^k=1} F_j + 2, \forall k \in N: 5 < \sum_{j \in S: \mu_j^k=1} F_j \le 10. \quad (25)$$

In cases of more than ten incident fibers, the OXC is duplicated (as much as needed) to handle exceeding fibers.

More general equations to compute OXC costs are given by (26)-(28). Equation (26) is for cases where there are two exceeding fibers to the overall node, i.e. 12, 22, 32, etc.

$$60.5 \times \sum_{j \in S: \mu_j^k=1} (F_j div 10) + 11.8, \forall k \in N: \sum_{j \in S: \mu_j^k=1} (F_j \bmod 10) \le 2. \quad (26)$$

And equations (27) and (28) are used in cases of three to five and six to ten exceeding fiber ports, respectively.

$$60.5 \times \sum_{j \in S: \mu_j^k=1} (F_j div 10) + 5.35 \times \sum_{j \in S: \mu_j^k=1} (F_j \bmod 10) + 2, \quad (27)$$

$$\forall k \in N: 2 < \sum_{j \in S: \mu_j^k=1} (F_j \bmod 10) \le 5.$$

$$60.5 \times \sum_{j \in S: \mu_j^k=1} (F_j div 10) + 5.85 \times \sum_{j \in S: \mu_j^k=1} (F_j \bmod 10) + 2, \quad (28)$$

$$\forall k \in N: 5 < \sum_{j \in S: \mu_j^k=1} (F_j \bmod 10) \le 10.$$

On the basis of hypothetical whole fiber cross-connect cost reductions in section 2, each glass switching device costs 11.8 if there are exactly two (working plus protection) fibers incident to the device. And equations (29) and (30) are used in three to five and six to ten incident fiber cases, as equivalences for (24) and (25). In attempting to prevent cases of more than ten incident fibers in whole fiber switched p-cycle designs, deriving general forms for equations (26)-(28) appeared quite difficult because working and protection fibers do not have the same price. As there is no rule to differentiate between working and protection fibers among exceeding and non-exceeding fibers, two different OXCs (one for working and the other for protection fibers) will be considered in cases where there are more than ten working and protection fibers.

$$5.35 \times \sum_{j \in S: \mu_j^k=1} \left(F_{w_j} + 0.1 \times F_{s_j}\right) + 2, \quad (29)$$

$$\forall k \in N: 2 < \sum_{j \in S: \mu_j^k=1} \left(F_{w_j} + F_{s_j}\right) \le 5.$$

$$5.85 \times \sum_{j \in S: \mu_j^k=1} \left(F_{w_j} + 0.1 \times F_{s_j}\right) + 2, \quad (30)$$

$$\forall k \in N: 5 < \sum_{j \in S: \mu_j^k=1} \left(F_{w_j} + F_{s_j}\right) \le 10.$$

In equations (24)-(30), S, Fj, $Fw_j$ and $Fs_j$ are defined as in previous mathematical ILP design models. In addition, N represents the set of nodes across the network, indexed by k; and $\mu_j^k \in \{0,1\}$ indicates whether or not node k is an end-node for span j; $\mu_j^k=1$ if it is, and $\mu_j^k=0$ if it is not).

Transponder Cards.

On the other hand, OXC transponder cards are priced on the basis of three maximum transmission distances (MTDs):

750, 1500 and 3000 km. For the current prevalent data rate of 10 Gbit/s, Gunkel et al and Huelsermann et al specifically report transponder costs of 1 for MTDs of 750 km, 1.4 for MTDs of 1500 km and 1.9 for MTDs of 3000 km. The same trend will be maintained for transponders needed on the whole fiber cross-connect switch.

Transparent Node Amplifier.

As earlier stated, one transparent node amplifier is placed at the entrance/exit of every OXC (in case, whole fiber cross-connect device) for each incident bidirectional fiber. The cost incurred is 1:25 a unit and the use of equation (31) determines the cost of all transparent amplifiers at a given node k.

$$1.25 \times \sum_{j \in S} F_j \cdot \mu_j^k, \forall k \in N. \tag{31}$$

Span Costs: IAs, DCFs, DGEs.

Also in FIG. 9A, the optical signal goes through an inline amplifier (IA) and a dispersion compensating fiber (DCF) every 80 km while traversing a given fiber. As well, the traveling signal transits through a dynamic gain equalizer (DGE) every four IAs. Any IA, DCF or DGE is shared by all optical paths traveling across a specific bidirectional fiber. From the CapEx cost perspective, IA and DCF prices depend on the three MTDs: 750 km, 1500 km and 3000 km. An IA costs 3 for MTDs of 750 km, 3:8 for MTDs of 1500 km and 4.7 for MTDs of 3000 km. With respect to the same MTDs, DCF costs are of 0:9, 1 and 1:2. Also, the NOBEL normalized cost for DGE is a constant equal to 3.

Maximum Transmission Distance (MTD)

Table 3 summarizes equipment costs within the NOBEL framework. Most prices depend on MTDs, meaning that if two transparent lightpaths of 600 and 800 km share a given transponder, the cost of that transponder is defined for an MTD of 1500 km because the next lowest MTD under the NOBEL cost model is 750 km (which does not handle the 800 km path). This MTD definition typifies end-to-end paths only. But more practically, the MTD of pure transmission equipment is based on the length of its longest incident span in fully opaque p-cycle designs. In hybrid p-cycle configurations, the MTD of transmission equipment depends on the longest length of end-to-end working paths and protection path-segments (within available p-cycles) that use the equipment in question. In fully transparent p-cycle designs, switching either at the wavelength or at the fiber level of granularity, the MTD for a transponder is imposed by the longest normal or restored state lightpath using the equipment in question. Regarding IA and DCF that relate to span fibers, two sets of MTDs are considered: one for working fibers and the other for protection fibers. Thus, the former is based on the length of the longest working path crossing the span in question while protection MTD depend on the longest restored state path length.

On the other hand, MTD calculation for hybrid and fully transparent p-cycle designs requires measuring (and limiting) the length of normal state paths, restored state paths and protection path-segments. In addressing optical reach control in p-cycle survivable networks, upcoming experiments will show several test case network instances that are found too large to respect MTDs of 3000 km in the restored network state. Following the trend of prices from 750 to 1500 km (i.e., 2×750) and from 1500 to 3000 km (i.e., 2×1500), a new MTD of 6000 km is defined in the last row of table 3. Corresponding equipment costs are 5.7 for an IA, 1.5 for a DCF and 2.5 for an OXC.

TABLE 3

Summary of Equipment Pricing Under the NOBEL Cost Model

| MTD | IA | DCF | DGE | Transponder | EXC Port |
|---|---|---|---|---|---|
| 750 km | $3 \times \left\lceil \frac{C_j}{80} \right\rceil$ | $0.9 \times \frac{C_j}{80}$ | $3.0 \times \left\lceil \frac{\left\lceil \frac{C_j}{80} \right\rceil}{4} \right\rceil$ | 1 | 0.28 |
| 1500 km | $3.8 \times \left\lceil \frac{C_j}{80} \right\rceil$ | $1.0 \times \frac{C_j}{80}$ | $3.0 \times \left\lceil \frac{\left\lceil \frac{C_j}{80} \right\rceil}{4} \right\rceil$ | 1.4 | 0.28 |
| 3000 km | $4.7 \times \left\lceil \frac{C_j}{80} \right\rceil$ | $1.2 \times \frac{C_j}{80}$ | $3.0 \times \left\lceil \frac{\left\lceil \frac{C_j}{80} \right\rceil}{4} \right\rceil$ | 1.9 | 0.28 |
| 6000 km | $5.7 \times \left\lceil \frac{C_j}{80} \right\rceil$ | $1.5 \times \frac{C_j}{80}$ | $3.0 \times \left\lceil \frac{\left\lceil \frac{C_j}{80} \right\rceil}{4} \right\rceil$ | 2.5 | 0.28 |

Case Studies and Experimental Results

The series of experiments was aimed at providing real-world CapEx costs for the test case instances in FIG. 2. But a direct cost optimization under standardized CapEx cost models, such as NOBEL in section 4.1, is a problem of considerable complexity. Instead, the CapEx cost evaluation method consisted of first solving wavelength and glass switched p-cycle ILPs in turn for each of the network instances under consideration; and characterizing in a second step the pre-generated (glass, opaque, hybrid and fully transparent) design solutions from the NOBEL cost perspective.

Table 4 summarizes experimental results. Test case instances in the first column comprise: Havana when considering the original demand pattern, Cost239, Italy, Bellcore and Euro networks. The largest traffic matrix for the Havana network is not considered, because in equations (21) and (C.1) all units for a given demand relation or cycle structure are required to ride from end-to-end onto the same fibers, which are otherwise assumed to comprise (only) 40 wavelengths each. The first column of table 4 also indicates the different types of WDM p-cycle configuration. As well, optical paths are often constrained under certain length limits in order to match MTD-related equipment prices, given in the NOBEL cost worksheet. Transparent reach limits of 750, 1500 and 3000 km are imposed in priority; and this optical reach limit is pushed up to 6000 km in cases where the optimization problem under consideration results in an unfeasible design under primary path length limitations. (The reader may want to refer to D. P. Onguetou, W. D. Grover, Approaches to p-Cycle Network Design with Controlled Optical Path Lengths in the Restored Network State, OSA Journal of Optical Networking (JoN) 7 (7) (2008) p. 673-691 for more details on p-cycle network design under optical length control.)

TABLE 4

Sample Results for Overall Real CapEx Costs

| Architecture | Minimum Spare Capacity | Node Costs | Span Costs | Transmission Costs | Overall CapEx Cost | Unused Wavelengths | Used Wavelengths on Max. Loaded Span |
|---|---|---|---|---|---|---|---|
| *Havana* | | | | | | | |
| opaque | 20,264 | 374 | 225 | 1224 | 1823 | 705 out of 1040 | 32 for 1 fiber |
| hybrid | | | not feasible for optical reach of 750 km | | | | |
| 1500 km | 25,513 | 374 | 275 | 663 | 1312 | 680 out of 1040 | 32 for 1 fiber |
| 3000 km | 20,264 | 374 | 310 | 712 | 1395 | 705 out of 1040 | 32 for 1 fiber |
| transparent | | | not feasible for optical reach of 750 km | | | | |
| 1500 km | 28,677 | 686 | 513 | 229 | 1428 | 1697 out of 2080 | 33 for 2 fibers |
| 3000 km | 20,264 | 647 | 506 | 355 | 1508 | 1625 out of 1960 | 32 for 2 fibers |
| glass switched | | | not feasible for optical reach of 750 and 1500 km | | | | |
| 3000 km | 6,691 fiber-kms | 466 | 460 | 340 | 1266 | 866 out of 1040 | 16 for 1 fiber |
| *Cost239* | | | | | | | |
| opaque | 85,640 | 342 | 800 | 1600 | 2742 | 493 out of 960 | 38 for 1 fiber |
| hybrid | | | not feasible for optical reach of 750 and 1500 km | | | | |
| 3000 km | 115,290 | 391 | 1250 | 1151 | 2792 | 550 out of 1080 | 52 for 2 fibers |
| 6000 km | 86,240 | 485 | 1703 | 1117 | 3305 | 853 out of 1320 | 38 for 2 fibers |
| transparent | | | not feasible for optical reach of 750 and 1500 km | | | | |
| 3000 km | 128,555 | 631 | 20113 | 511 | 3255 | 1293 out of 1760 | 38 for 2 fibers |
| glass switched | | | not feasible for optical reach of 750, 1500 and 3000 km | | | | |
| 6000 km | 18,585 fib-kms | 380 | 1591 | 657 | 2628 | 585 out of 880 | 37 for 1 fiber |
| *Italy* | | | | | | | |
| opaque | 55,654 | 685 | 280 | 5960 | 6925 | 523 out of 2320 | 196 for 5 fibers |
| hybrid | | | | | | | |
| 750 km | 90,892 | 452 | 369 | 2974 | 3795 | 816 out of 2960 | 263 for 9 fibers |
| 1500 km | 55,929 | 401 | 472 | 2860 | 3732 | 1417 out of 3200 | 182 for 6 fibers |
| 3000 km | 55,654 | 435 | 515 | 2932 | 3882 | 1203 out of 3000 | 196 for 7 fibers |
| transparent | | | | | | | |
| 750 km | 120,471 | 375 | 527 | 651 | 1553 | 1608 out of 4160 | 223 for 7 fibers |
| 1500 km | 58,241 | 326 | 501 | 1026 | 1853 | 1756 out of 3560 | 210 for 9 fibers |
| 3000 km | 55,654 | 502 | 445 | 1366 | 2313 | 1083 out of 2880 | 196 for 7 fibers |
| glass switched | | | not feasible for optical reach of 750 km | | | | |
| 1500 km | 4707 fiber-kms | 456 | 362 | 1006 | 1824 | 501 out of 1440 | 123 for 4 fibers |
| 3000 km | 4420 fiber-kms | 443 | 463 | 1357 | 2163 | 501 out of 1440 | 123 for 4 fibers |
| *Bellcore* | | | | | | | |
| opaque | 14,591 | 709 | 160 | 4500 | 5369 | 462 out of 1960 | 116 for 3 fibers |
| hybrid | | | | | | | |
| 750 km | 16,274 | 524 | 232 | 2471 | 3227 | 641 out of 2240 | 164 for 5 fibers |
| 1500 km | 14,591 | 457 | 279 | 2471 | 3207 | 462 out of 1960 | 116 for 3 fibers |
| 3000 km | 14,591 | 457 | 279 | 2471 | 3207 | 1262 out of 2760 | 116 for 4 fibers |
| transparent | | | | | | | |
| 750 km | 17,784 | 522 | 236 | 843 | 1600 | 1245 out of 2880 | 180 for 5 fibers |
| 1500 km | 14,591 | 569 | 304 | 1181 | 2055 | 1742 out of 3240 | 116 for 4 fibers |
| 3000 km | 14,591 | 564 | 325 | 1363 | 2252 | 1662 out of 3160 | 116 for 3 fibers |
| glass switched | | | | | | | |
| 750 km | 1615 fiber-kms | 368 | 225 | 846 | 1439 | 499 out of 1360 | 100 for 3 fibers |
| 1500 km | 1270 fiber-kms | 395 | 193 | 1169 | 1757 | 499 out of 1360 | 100 for 3 fibers |
| 3000 km | 1259 fiber-kms | 399 | 213 | 1250 | 1862 | 499 out of 1360 | 100 for 3 fibers |
| *Euro* | | | | | | | |
| opaque | 235,206 | 1416 | 893 | 11,815 | 14,124 | 835 out of 4680 | 164 for 5 fibers |
| hybrid | | | not feasible for optical reach of 750 and 1500 km | | | | |
| 3000 km | 260,974 | 1164 | 1973 | 6935 | 10,072 | 2670 out of 6760 | 204 for 7 fibers |
| transparent | | | not feasible for optical reach of 750 and 1500 km | | | | |
| 3000 km | 283,729 | 1210 | 1818 | 4358 | 7386 | 1838 out of 6080 | 190 for 6 fibers |
| glass switched | | | not feasible for optical reach of 750 and 1500 km | | | | |
| 3000 km | 19,861 fib-kms | 740 | 1790 | 4404 | 6934 | 930 out of 2920 | 96 for 3 fibers |

Spare Capacity Required in the Designs

The second column of table 4 records total spare capacity requirements in prior-generated design solutions. If not indicated, total capacities are expressed in terms of channel-kms for opaque, hybrid and fully transparent wavelength switched p-cycle design solutions. In glass switched p-cycle designs, spare capacity requirements are expressed as fiber-kms. But for the Havana instance carrying the original set of demands over shortest hop-count routes, spare capacity is expressed in channels and fibers for wavelength and whole fiber switched p-cycles, respectively.

In general, higher spare capacities are required to achieve designs under smaller optical reach limits. Considering the same optical reach limit, wavelength switched transparent designs require more spare capacity than opaque and hybrid p-cycle designs. This is because optical reach limits are imposed to long end-to-end normal and restored state paths in fully transparent networks. In contrast, other wavelength switched p-cycle configurations force the same distance limits upon end-to-end working paths and smaller protection path-segments (for hybrids), and on spans for opaque designs. As whole fiber switched p-cycle capacity requirements are expressed in terms of fiber-kms (instead of channel-kms), note that the comparative study of spare capacity requirements relate to wavelength switched p-cycles only.

CapEx Cost Perspectives

Columns 3 to 6 in table 4 results from applying the NOBEL cost model to pre-generated p-cycle designs. CapEx costs are broken into four data sets: node, span, transmission and overall total costs. Node costs encompass the costs of OXCs (or whole fiber cross-connects, in case) with their fiber ports and transparent node amplifiers. Span costs include IA, DCF and DGE elements that are allocated per bidirectional fiber span. And transmission costs encompass all path termination and per-signal switching costs, i.e. EXC ports and transponder cards.

In opaque p-cycle networks, node costs used to be low due to the flexibility of opacity that implies less fiber requirements, and thus less OXC fiber ports, in comparison to other hybrid and fully transparent configuration types. Spans are also cheaper as the number of IAs, DCFs and DGEs involved in the equipment pricing exercise decreases with the smaller number of fibers required in the design. And furthermore, IAs and DCFs used are applied the lowest possible costs as MTDs in opaque network architectures, with wavelength conversion assumed at all nodes, are only imposed by longer spans. But transmission costs are much higher with opaque p-cycles than with any other p-cycle configuration type because of EXC ports and transponder cards required for electrical switching operations. Despite node and span cost-effectiveness, opaque p-cycle designs appear more expensive than other WDM p-cycle configuration because of those higher transmission costs.

Although not as expensive as opaque p-cycle configurations, hybrid and transparent wavelength switched p-cycle designs are still a bit expensive. Node costs are cheaper in hybrid p-cycle architectures due to a lower number of fiber requirements in the design. But span costs are higher than in the opaque case because they are subject to higher MTDs, calculated on the basis of longer end-to-end working paths and protection path-segments. More harmful, transmission costs significantly rise up (once again) because of electrical switching at p-cycle entry points increases the number EXC ports and OXC transponders. In contrast, fully transparent wavelength switched p-cycles involve lower transmission costs, given that only an optical switching (i.e., one transponder) is required at the sole ingress and egress nodes for add/drop operations. But this is subject to some node and span cost penalties because more fibers (one set for working and another for protection purposes) are required in the design, and MTDs are much higher as they are calculated on the basis of longer (end-to-end) normal and restored network state path lengths.

Which of the hybrid or fully transparent wavelength switched p-cycle configuration is better from CapEx cost perspectives? The answer depends on whether or not the network under consideration is lightly or highly loaded. For network instances with lower traffic volumes, such as Havana and Cost239 instances, protection switching is seldom required in the hybrid type of configuration; resulting EXC port and transponder card costs cannot balance with node fiber port, IA, DCF and DGE equipment prices in corresponding fully transparent p-cycle designs. In contrast, highly loaded networks such as Italy, Bellcore and Euro involve much lower costs in fully transparent p-cycle contexts. The penalty imposed to transmission costs by hybrid intermediate protection switching is much higher than that of fiber duplications to node and span costs required by full transparency.

Overall, whole fiber switched p-cycles stand as the most promising configuration from CapEx cost perspectives for all test case instances. The fiber-level protection paradigm greatly diminishes the number of fibers required in the design. This typically results in lower node costs, somewhere in between that of opaque/hybrid and fully transparent wavelength switched p-cycle designs, as the set of protection fibers involve as well an additional 90% saving over working fiber port costs. Span and transmission costs are quite similar to that of fully transparent p-cycle designs because of higher MTDs, based on longer end-to-end normal and restored state path lengths, in both cases. More generally, whole fiber switched p-cycles also appear to be of great benefits to overall CapEx costs for a wide range of networks and traffic payloads. In practice, whole fiber switched p-cycles are thus applicable to metro-core networks, which are basically cost sensitive and highly loaded.

Fiber Utilization Ratios

The seventh and eighth columns in table 4 pertains to fiber utilization levels. The seventh column specifically reports ratios of unused to total wavelengths and the eighth column records the numbers of fibers and wavelengths used on the maximally loaded span. In contrast to wavelength switched p-cycles, results for whole fiber switched p-cycles only address working fiber loads (as protection fiber utilization levels follow automatically).

The eighth column of table 4 reveals medium to very high fiber utilization ratios for maximally loaded spans: 27 to 95% in the Havana and Cost239 lightly loaded networks and 58 to 98% in Italy, Bellcore and Euro test case instances. In contrast to maximally loaded spans, the seventh column shows overall small levels of fiber utilization: 51 to 85% of unused wavelengths for lightly network instances and 18 to 54% for highly loaded networks. But fiber utilization ratios used to be lower in (both wavelength and glass switched) transparent p-cycle designs, because fully transparency using p-cycles assumes working and protection wavelengths traveling onto different sets of fibers. In the specific case of whole fiber switched p-cycle designs, low fiber utilization ratios can however be of great interest for dynamic traffic concerns. Noticeably, as much as 32 to 84% of working wavelengths available within the network remain unused in glass switched p-cycle designs. Thus, there is a considerably high probability to build working lightpaths within unused wavelength channels for new demand relations. And if so, newcomers are automatically protected as is the philosophy of fiber-level protection.

Optical Reach Concerns

In analyzing the effect of distance limits on overall CapEx costs, opaque p-cycle designs are skipped because an electrical switching is performed at all nodes and resulting MTDs depend on span lengths only. Most of the time, hybrid p-cycle designs are achievable for all of the three basic MTDs due to regeneration applied at p-cycle access points. This greatly reduces span costs so that in lightly loaded networks, such as Havana and Cost239, total CapEx costs are better than costs incurred by corresponding fully transparent wavelength switched p-cycle designs, and very close to the total cost of whole fiber switched p-cycle designs. In fact, fully transparent p-cycle designs for both wavelength and glass switched consideration are achievable for higher MTDs, because MTD calculation takes into account the length of surviving portions of failed working paths plus protection segments.

Typically, the conclusions of the CapEx study are valid for the same specific optical reach limit for all p-cycle configurations of a given network instance. When considering two different optical reach limits however, the smaller of them provides (in most cases) minimum CapEx costs regardless of the p-cycle configuration type under consideration.

is that the other survivability schemes are path-oriented, and thus require protection switching capabilities at ingress and egress nodes, directly control the length of lightpaths, and do not differentiate between working and protection fibers. The all-optical (i.e., fully transparent) wavelength switched p-cycle case that also shows many of those properties however implies the usage of two sets of fibers (one for working and the other for protection), which results in increased span cost lengths. Fortunately, whole fiber switched p-cycles provide significant improvements from the CapEx cost viewpoint so that the designs produced stay in the same cost-range as other architectures.

TABLE 5

Comparative Havana CapEx Costs for Different Survivable Network Architectures

| Architecture | Total Capacity | Node Costs | Span Costs | Transmission Costs | Overall CapEx Cost | Unused Wavelengths | Used Wavelengths on Max. Loaded Span |
|---|---|---|---|---|---|---|---|
| Comparative Survivable Architectures | | | | | | | |
| 1 + 1 APS | | 374 | 275 | 403 | 1052 | 587 | 40 |
| 1:1 APS | | 436 | 313 | 207 | 956 | 587 | 47 |
| DSP | 445 channels | 374 | 275 | 209 | 858 | 595 | 36 |
| PXTs | | | | | | | |
| 1500 km | 334 channels | 374 | 275 | 289 | 937 | 639 | 28 |
| 3000 km | | 374 | 331 | 315 | 1020 | 665 | 24 |
| FIPPs | | | | | | | |
| original | 342 channels | 374 | 328 | 589 | 1290 | 667 | 29 |
| 1500 km (MUPS) | | 374 | 273 | 350 | 997 | 495 | 33 |
| p-Cycles | | | | | | | |
| opaque | 300 channels | 374 | 225 | 1035 | 1634 | 740 | 22 |
| hybrid | | not feasible for optical reach of 750 km | | | | | |
| 1500 km | 318 channels | 374 | 275 | 613 | 1261 | 722 | 26 |
| 3000 km | 300 channels | 374 | 325 | 646 | 1345 | 740 | 22 |
| transparent | | not feasible for optical reach of 750 km | | | | | |
| 1500 km | 334 channels | 686 | 275 | 261 | 1222 | 1746 | 32 |
| 3000 km | 300 channels | 661 | 325 | 372 | 1358 | 1700 | 22 |
| glass switched | | not feasible for optical reach of 750 km | | | | | |
| 1500 km | 53 fibers | 451 | 271 | 269 | 991 | 874 | 20 |
| 3000 km | 45 fibers | 457 | 311 | 366 | 1135 | 874 | 20 |

Comparison of p-Cycles with Other Survivability Schemes from the CapEx Cost Perspective CapEx costs of p-cycle related architectures are now compared to that of 1+1 APS, 1:1 APS, DSP, PXT and FIPP fully pre-cross-connected survivability schemes. The Havana test case network is considered for experiments, using the original demand pattern with a shortest hop-count routing under normal network conditions. The first half of table 5 reports comparative results previously generated as part of A. Grue, W. D. Grover, M. Clouqueur, D. A. Schupke, D. Baloukov, D. P. Onguetou, B. Forst, Capex Costs of Lightly Loaded Restorable Networks Under a Consistent WDM Layer Cost Model, in: Proceedings of the IEEE International Conference on Communications (ICC), Dresden, Germany, 2009. The second half of table 5 repeats results for p-cycles, with the difference that IA, DCF and DGE components are now counted per span (instead of bidirectional fiber as before) in order to match the assumptions made for other architectures. In the same manner, the second column now reports total (working and spare) capacity required in the designs, rather than spare capacity only. Interpreting results of table 5, it is disappointing to see how bad wavelength switched p-cycles perform vis-à-vis other survivable network architectures. The reason Possible Applications and Further Concerns Whole fiber switched p-cycle designs present significant advantages from many different aspects. Actual whole fiber cross-connect switches are presented to be a very competitive technology, fully applicable to the design of p-cycle transport networks. From network planning, operation and management perspectives, glass switched p-cycles greatly reduce the complexity incurred in achieving the goal of transparency that implies wavelength assignment and wavelength continuity constraints. Whole fiber switched p-cycles also appear to be of great benefits to overall CapEx costs for a wide range of networks and traffic payloads. In practice, whole fiber switched p-cycles are useful for dynamic traffic considerations and are applicable to metro-core networks.

Appendix A. ILP for Conventional p-Cycle Minimum Spare Capacity Design

As a reminder, equations (A.1)-(A.3) comprise the conventional p-cycle minimum spare capacity ILP, within the prior-ILP symbology. The aim is to minimize total spare capacity while ensuring 100% restorability against single span failures through p-cycles that are built in the spare capacity.

$$\text{Minimize} \sum_{j \in S} C_j \cdot s_j. \quad (A.1)$$

$$w_i \le \sum_{p \in P} x_i^p \cdot \eta^p, \forall\, i \in S \quad (A.2)$$

$$s_j = \sum_{p \in P: x_j^P = 1} \eta^p, \forall\, j \in S \quad (A.3)$$

Appendix B. ILP Design Model for Opaque Wavelength Switched p-Cycles Even though the ILP for conventional p-cycle minimum spare capacity designs is usable (as is) in opaque p-cycle network planning, the following variant was used within experiments to better fit the CapEx cost evaluation. Equations (A.2)-(B.2) define the ILP considered for fully opaque p-cycle designs: the objective function (B.1) replaces equation (A.1) in order to bias the design towards choosing p-cycles that will minimize the total number of fiber optics.

$$\text{Minimize} \sum_{j \in S} C_j \cdot s_j + \alpha \cdot \sum_{j \in S} F_j. \quad (B.1)$$

Constraints (A.2) and (A.3) remain the same. And the use of equation (B.2) computes the number of fibers required in the design.

$$F_j \ge \frac{w_j + s_j}{|C|}, \forall\, j \in S. \quad (B.2)$$

Appendix C. ILP Design Model for Hybrid p-Cycle Configurations

The ILP design model for hybrid p-cycle configurations is given by equations (A.2)-(B.2), (21) and (C.1)-(C.3). This ILP thus re-uses all equations available for the opaque case, plus four additional sets of constraints pertaining to wavelength continuity requirements along working paths and p-cycles. More specifically, the use of equations (21) and (C.1) assigns a single wavelength to every working path and to every unit-sized copy of p-cycle in the design.

$$\sum_{l \in C} \varsigma_l^p = \eta^p, \forall\, p \in P. \quad (C.1)$$

The use of equation (C.2) ensures that each specific wavelength is assigned no more than once into any fiber optic and the use of equation (C.3) makes sure that overall, wavelength allocation not exceed the number of fibers available on each given span.

$$\sum_{r \in D} \lambda_l^r \cdot \delta_j^r + \sum_{p \in P: x_j^P = 1} \varsigma_l^p \le F_j, \forall\, j \in S, \forall\, l \in C. \quad (C.2)$$

$$\sum_{r \in D, l \in C} \lambda_l^r \cdot \delta_j^r + \sum_{p \in P, l \in C: x_j^P = 1} \varsigma_l^p \le F_j \cdot |C|, \forall\, j \in S. \quad (C.3)$$

Appendix D. ILP Design Model for Fully Transparent p-Cycle Designs

Equations (18), (21)-(23), (A.2)-(A.3), (C.1) and (D.1)-(D.4) comprise the ILP mathematical design model formulated for fully transparent p-cycles. In concept, this ILP is very close to the hybrid ILP model. But in prior constraints (B.2) and (C.2)-(C.3) are broken in a way that separates working and protection fibers. Accordingly, the use of equations (18) and (D.1) counts the number of working fibers and the number of protection fibers in the design.

$$F_{s_j} \ge \frac{s_j}{|C|}, \forall\, j \in S. \quad (D.1)$$

The use of equations (22) and (D.2) ensures that every wavelength is uniquely assigned into a given fiber; (22) pertains to working fibers while (D.2) is for protection fibers.

$$\sum_{p \in P: x_j^P = 1} \varsigma_l^p \le F_{s_j}, \forall\, j \in S, \forall\, l \in C. \quad (D.2)$$

Equations (23) and (D.3) are used to keep the number of wavelengths assigned in the design under what is available within each fiber. Again, (23) relates to working fibers while (D.3) pertains to protection fibers.

$$\sum_{p \in P, l \in C: x_j^P = 1} \varsigma_l^p \le F_{s_j} \cdot |C|, \forall\, j \in S. \quad (D.3)$$

The objective function is adjusted as well, in order to minimize spare capacity requirements while biasing the selection of p-cycles towards choosing those that involve less (working and protection) fibers in the design.

$$\text{Minimize} \sum_{j \in S} C_j \cdot s_j + \alpha \cdot \sum_{j \in S} (F_{w_j} + F_{s_j}). \quad (D.4)$$

We have shown that whole fiber cross-connect switches now constitute a very competitive technology, fully applicable in the context of p-cycles. Furthermore, whole fiber switched p-cycles present many features and advantages from different aspects. From network planning, operation and management perspectives, glass switched p-cycles greatly reduce complexity due to the goals of transparency. On the other hand, whole fiber p-cycles are also of great benefits to overall cost enhancements. Possible applications for whole fiber switched p-cycles can be metro-core networks that are basically cost sensitive and high loaded networks.

Immaterial modifications may be made to the embodiments described here without departing from what is covered by the claims. In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

What is claimed is:

1. An optical telecommunications network comprising:

plural nodes connected by plural spans and arranged to form a mesh network, each span comprising at least an optical fiber, at least a span of the plural spans having a different total capacity than at least another span of the plural spans, at least one pre-configured cycle of spare capacity being established in the mesh network, the pre-configured cycle including plural nodes of the mesh network and being pre-connected in readiness for a span failure in advance of the span failure;

whole-fiber optical switches, each node of the plural nodes of the mesh network having at least a whole fiber optical switch of the whole fiber optical switches, the plural nodes of the pre-configured cycle being configured to in the event of a span failure redirect signals affected by the span failure onto the pre-configured cycle using the whole fiber optical switches; and in which there is at least a span that straddles the at least one pre-configured cycle, and the pre-configured cycle has at least a whole fiber of spare capacity, and the at least a span that straddles the at least one pre-configured cycle has two whole fibers of working capacity for each whole fiber of spare capacity in the at least one pre-configured cycle, and the whole fibers of working capacity of the at least a span that straddles the at least one pre-configured cycle are protected by the at least a whole fiber of spare capacity of the at least one pre-configured cycle.

* * * * *